(12) United States Patent
Tian et al.

(10) Patent No.: US 12,047,215 B2
(45) Date of Patent: Jul. 23, 2024

(54) TECHNIQUES FOR DEMODULATION REFERENCE SIGNALING FOR MULTI-CHANNEL SEMI- PERSISTENT SCHEDULING

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/643,328

(22) Filed: Dec. 8, 2021

(65) Prior Publication Data

US 2023/0179460 A1    Jun. 8, 2023

(51) Int. Cl.
*H04L 27/26*     (2006.01)
*H04L 5/00*     (2006.01)
*H04W 72/12*     (2023.01)
*H04W 72/1273*     (2023.01)
*H04W 72/23*     (2023.01)

(52) U.S. Cl.
CPC ........ *H04L 27/2613* (2013.01); *H04L 5/0051* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0052420 A1* | 2/2019 | Manolakos | ........... H04L 5/0051 |
| 2022/0217756 A1* | 7/2022 | Wu | ........................ H04L 5/0055 |
| 2023/0180228 A1 | 6/2023 | Tian et al. | |

* cited by examiner

*Primary Examiner* — Hong Shao
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive an indication of a demodulation reference signal (DMRS) pattern for a burst of physical downlink shared channel (PDSCH) communications, wherein the burst of PDSCH communications includes one or more associated PDSCH communications within a period of the burst of PDSCH communications, and wherein the DMRS pattern indicates a pattern of DMRS transmitted in the burst of PDSCH communications. The UE may receive the burst of PDSCH communications based at least in part on the DMRS pattern. Numerous other aspects are described.

30 Claims, 10 Drawing Sheets

TECHNIQUES FOR DEMODULATION REFERENCE SIGNALING FOR MULTI-CHANNEL SEMI- PERSISTENT SCHEDULING

FIELD OF THE DISCLOSURE

Aspects of the present disclosure generally relate to wireless communication and to techniques and apparatuses for demodulation reference signaling for multi-channel semi-persistent scheduling.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving an indication of a demodulation reference signal (DMRS) pattern for a burst of physical downlink shared channel (PDSCH) communications, wherein the burst of PDSCH communications includes one or more associated PDSCH communications within a period of the burst of PDSCH communications, and wherein the DMRS pattern indicates a pattern of DMRS transmitted in the burst of PDSCH communications. The method may include receiving the burst of PDSCH communications based at least in part on the DMRS pattern.

Some aspects described herein relate to a method of wireless communication performed by a base station. The method may include transmitting an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The method may include transmitting the burst of PDSCH communications based at least in part on the DMRS pattern.

Some aspects described herein relate to an apparatus for wireless communication at a UE. The apparatus may include a memory and one or more processors coupled to the memory. The one or more processors may be configured to receive an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The one or more processors may be configured to receive the burst of PDSCH communications based at least in part on the DMRS pattern.

Some aspects described herein relate to an apparatus for wireless communication at a base station. The apparatus may include a memory and one or more processors coupled to the memory. The one or more processors may be configured to transmit an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The one or more processors may be configured to transmit the burst of PDSCH communications based at least in part on the DMRS pattern.

Some aspects described herein relate to a non-transitory computer-readable medium that stores a set of instructions for wireless communication by a UE. The set of instructions, when executed by one or more processors of the UE, may cause the UE to receive an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The set of instructions, when executed by one or more processors of the UE, may cause the UE to receive the burst of PDSCH communications based at least in part on the DMRS pattern.

Some aspects described herein relate to a non-transitory computer-readable medium that stores a set of instructions for wireless communication by a base station. The set of instructions, when executed by one or more processors of the base station, may cause the base station to transmit an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The set of instructions, when executed by one or more processors of the base station, may cause the base station to transmit the burst of PDSCH communications based at least in part on the DMRS pattern.

Some aspects described herein relate to an apparatus for wireless communication. The apparatus may include means for receiving an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The apparatus may include means for receiving the burst of PDSCH communications based at least in part on the DMRS pattern.

Some aspects described herein relate to an apparatus for wireless communication. The apparatus may include means for transmitting an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The apparatus may include means for transmitting the burst of PDSCH communications based at least in part on the DMRS pattern.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
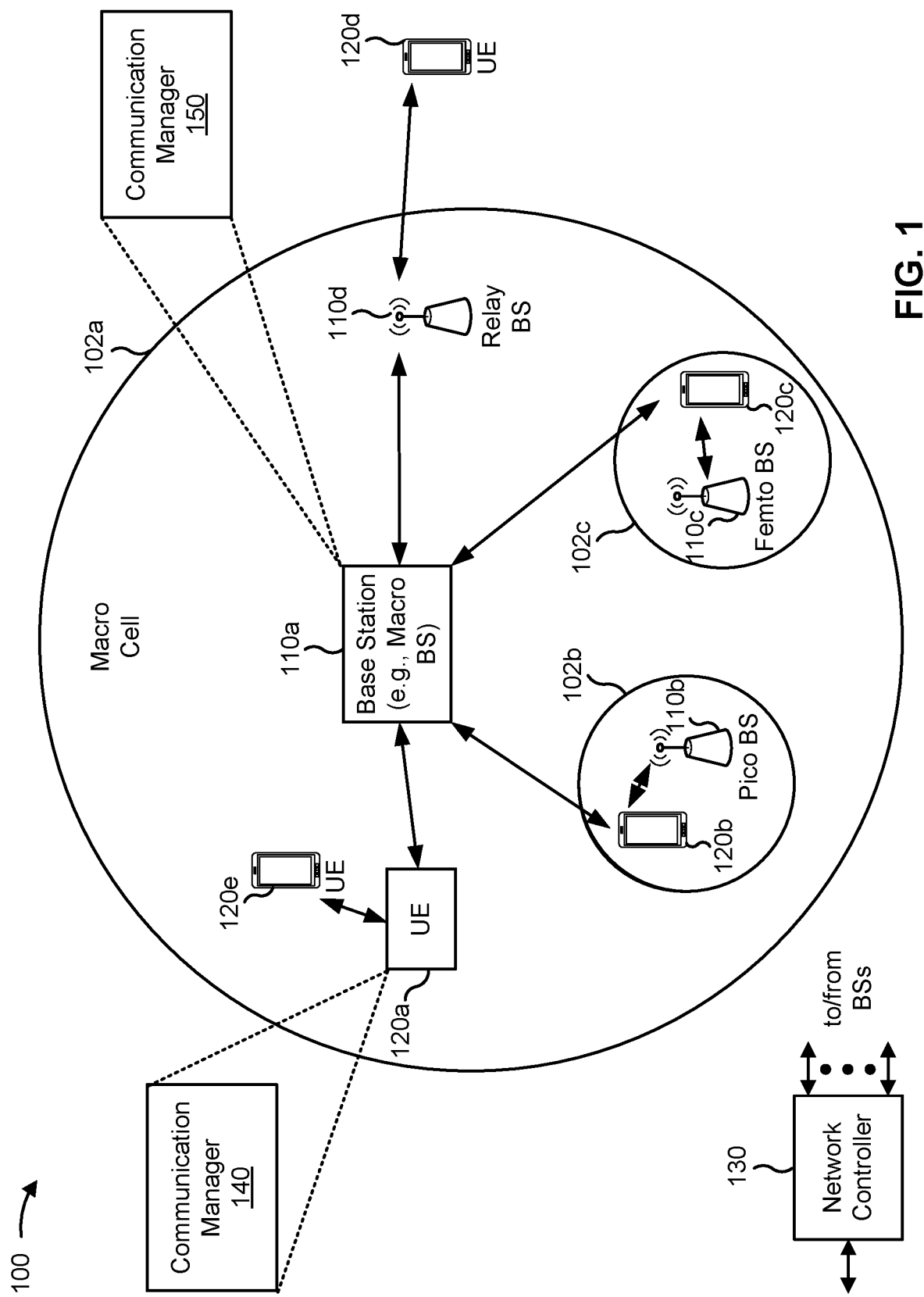
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications; and receive the burst of PDSCH communications based at least in part on the DMRS pattern. Additionally, or alternatively, the communication manager 140 may perform one or more other operations described herein.

In some aspects, the base station 110 may include a communication manager 150. As described in more detail elsewhere herein, the communication manager 150 may transmit an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications; and transmit the burst of PDSCH communications based at least in part on the DMRS pattern. Additionally, or alternatively, the communication manager 150 may perform one or more other operations described herein.

As indicated above, FIG. 1 is provided as an example. Other examples may differ from what is described with regard to FIG. 1.

Figure 2:
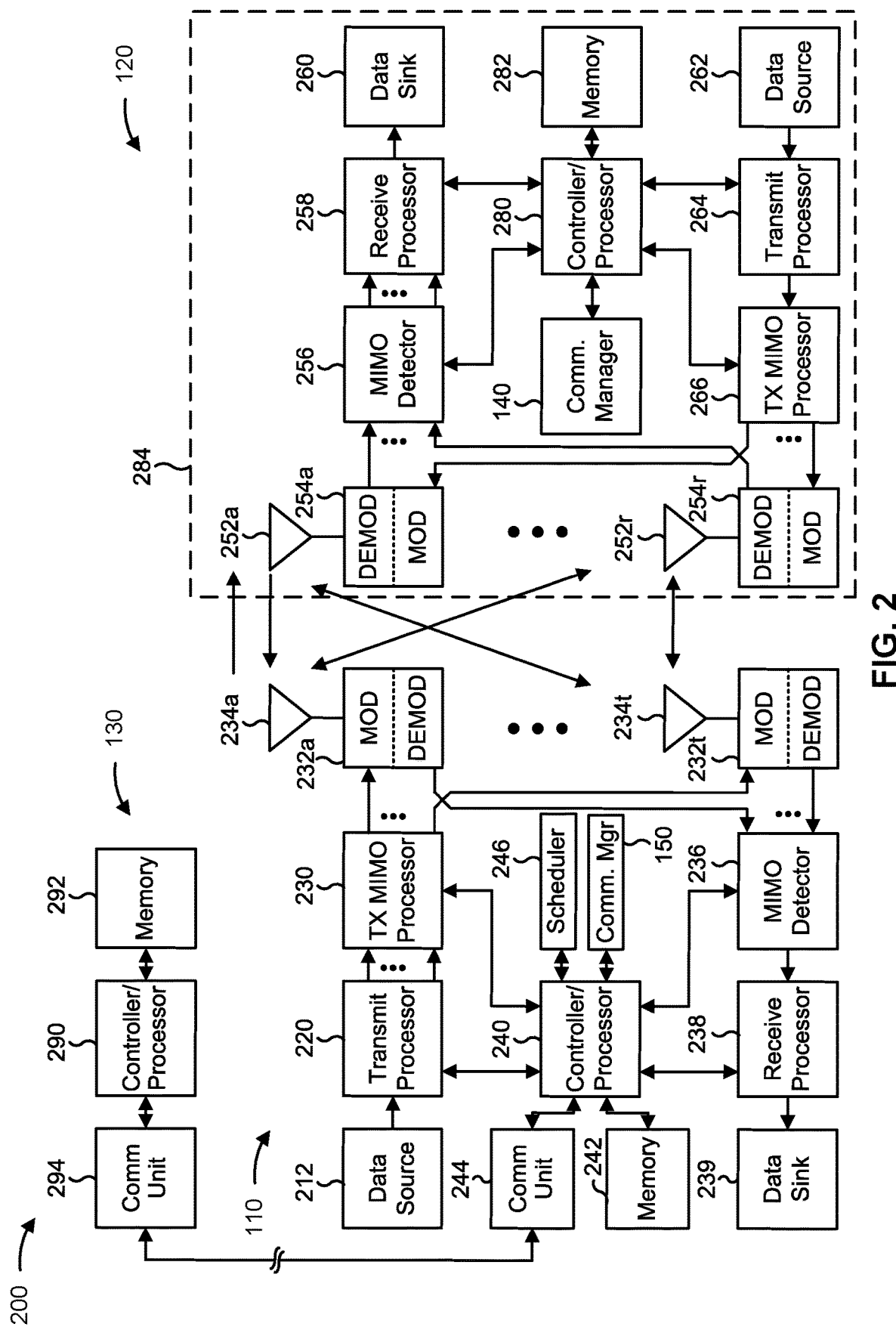
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with demodulation reference signaling for multi-channel semi-persistent scheduling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications; and/or means for receiving the burst of PDSCH communications based at least in part on the DMRS pattern. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications; and/or means for transmitting the burst of PDSCH communications based at least in part on the DMRS pattern. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
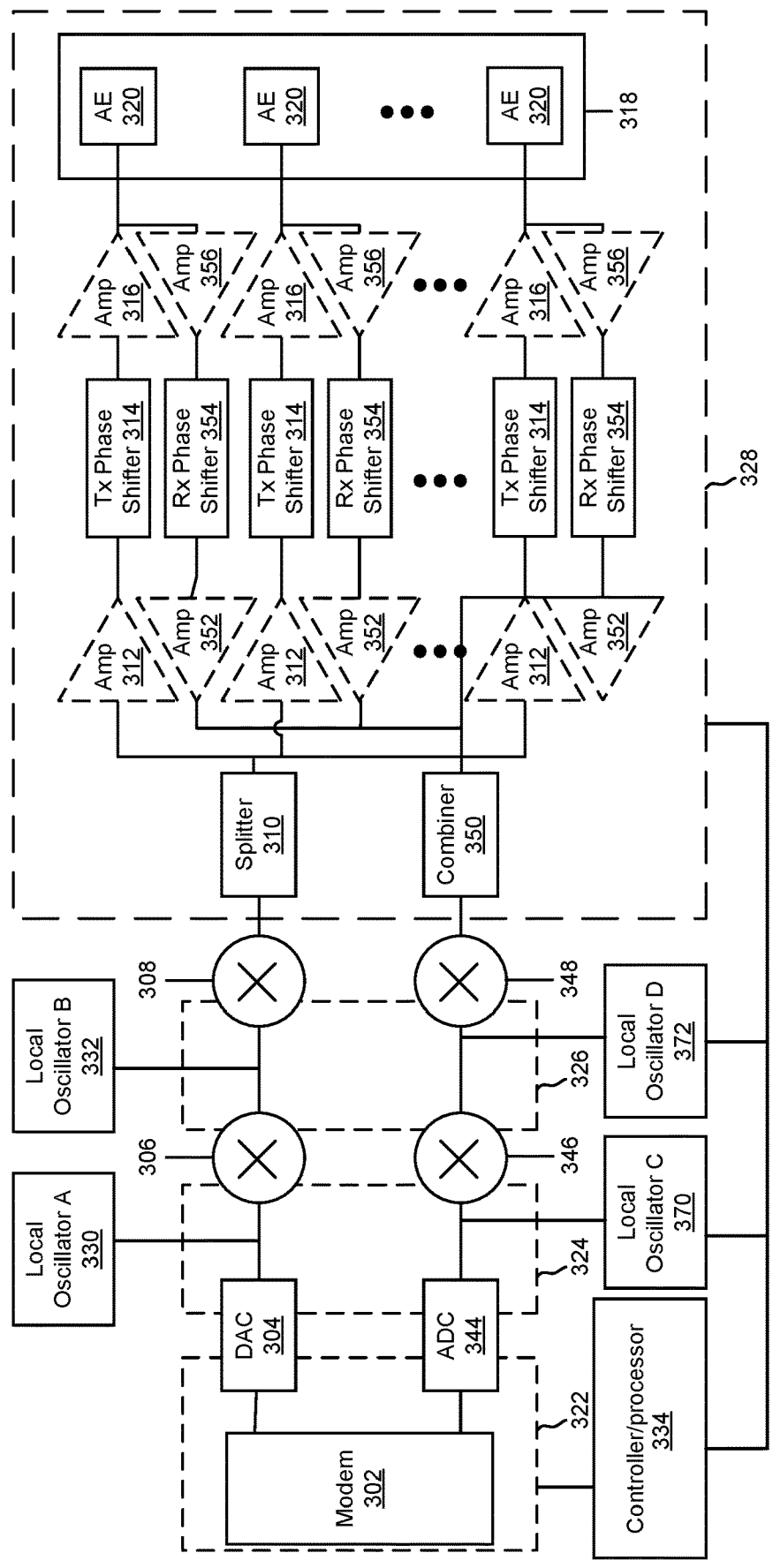
FIG. 3 is a diagram illustrating an example beamforming architecture that supports beamforming for millimeter wave communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of the wireless network 100. In some aspects, architecture 300 may be implemented in a transmitting device (e.g., a first wireless communication device, UE, or base station) and/or a receiving device (e.g., a second wireless communication device, UE, or base station), as described herein.

Some aspects of the disclosure relate to network devices, such as a base station 110 and UE 120, communicating in mmW frequency bands. In such aspects, beamforming and other directional communication techniques may be employed to increase coverage, particularly for use cases with UEs having limited or no mobility. FIG. 3 is a diagram illustrating example hardware components of a wireless communication device that may be implemented for such techniques. More particularly, the illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, and/or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, or similar operations.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
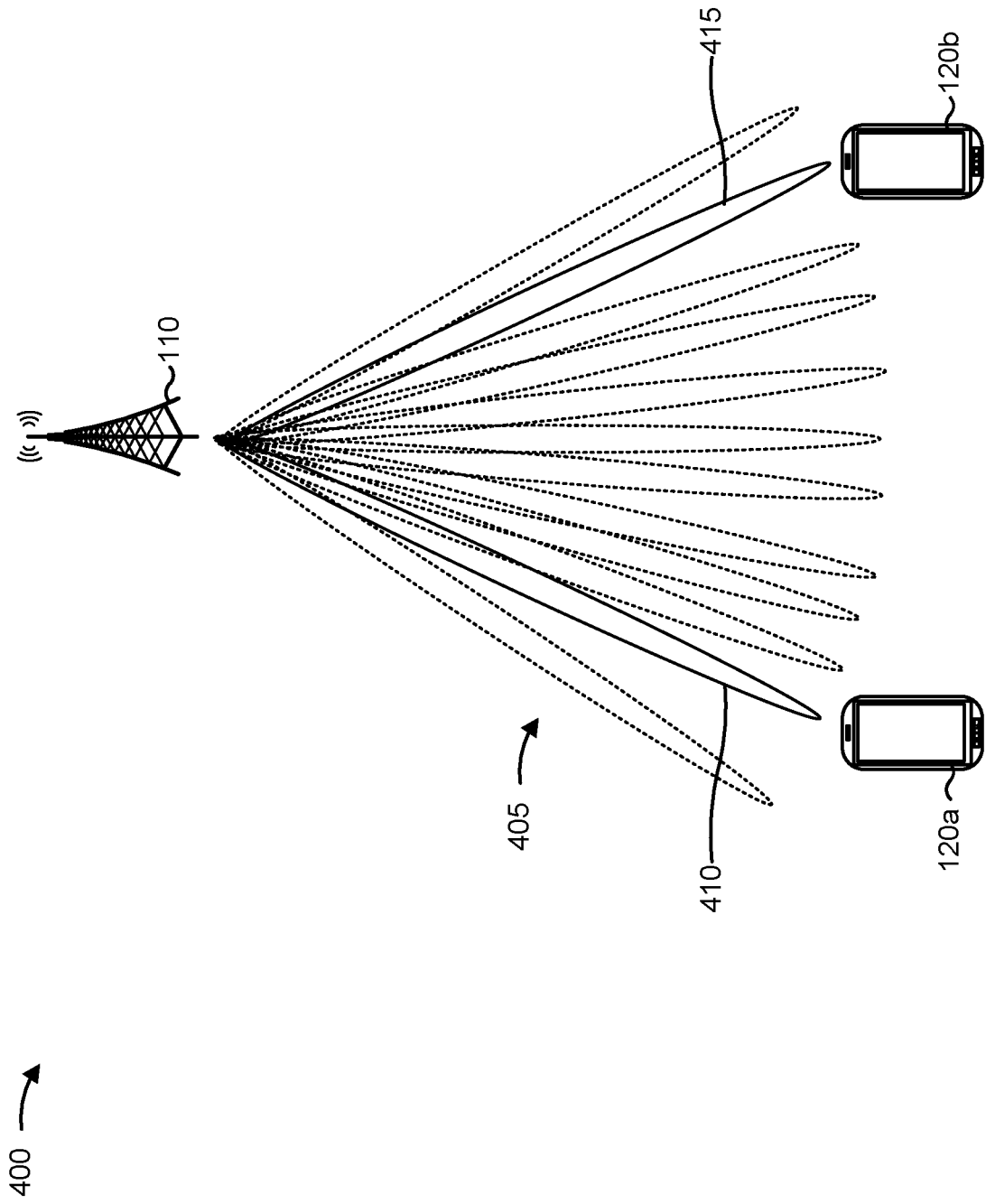
FIG. 4 is a diagram illustrating an example of a base station in communication with multiple UEs using beamforming techniques, in accordance with the present disclosure.

FIG. 4 is a diagram illustrating an example 400 of a base station 110 in communication with multiple UEs 120a, 120b using beamforming techniques, in accordance with the present disclosure.

Beamforming and similar techniques, such as those described in connection with FIG. 3, may be particularly desirable for high frequency carrier waves, such as EHF waves, mmW, and similar waves. This is because, as compared to low frequency carrier waves (e.g., waves having frequencies approximately 6 GHz and below), high frequency carrier waves are more vulnerable to propagation loss, diffraction, atmospheric attenuation, and similar distortion due to the carrier waves' relatively short wavelengths (which, in some aspects, may approach one millimeter or even shorter). Thus, network devices may implement directional communication, such as beamforming and related technologies, in order to transmit and/or receive high frequency waves over long distances and/or to provide adequate network coverage.

In the example 400 shown in FIG. 4, a base station 110 is in communication with two UEs (e.g., a first UE 120a and a second UE 120b) using directional communication or beamforming techniques. The base station 110 may be capable of concentrating a signal output from an antenna array to form one or more directional beams, as generally shown by the groups of beams or lobes indicated by reference number 405, using one or more techniques described above in connection with FIG. 3. In the depicted instance, the base station 110 concentrates a first beam 410 to provide coverage for the first UE 120a, and the base station 110 concentrates a second beam 415 to provide coverage for the second UE 120b. In this way, the base station 110 is able to provide coverage to relatively distant UEs 120a and 120b while communicating using high frequency carrier waves.

While beamforming and similar techniques, such as those described in connection with FIG. 3 and illustrated in FIG. 4, may improve the performance of mmW and other high frequency communications, beamforming may require high antenna gains to produce the necessary effective isotropic radiated power (EIRP) needed to transmit communications over long distances and/or to provide adequate coverage. Thus, high frequency carrier waves are often implemented in applications that can take advantage of narrow, concentrated beams, such as use cases involving low mobility, including fixed point to fixed point communications, fixed point to multiple point communications, or similar communications. For example, and returning to the example 400 shown in FIG. 4, the first beam 410 and the second beam 415 are relatively narrow, providing adequate coverage to the first UE 120a and the second UE 120b, respectively, when the UEs 120a and 120b are stationary, but the beams 410 and 415 may provide poor coverage for a mobile UE, which would change position, change orientation, or otherwise leave the coverage area of a beam relatively quickly. In order to achieve the high EIRP requirements necessary to provide adequate coverage to distant UEs when implementing high frequency carriers, it is desirable to reduce unnecessary power consumption as much as possible, such as by reducing power consumption associated with control overhead, which will be described in more detail in connection with FIG. 5.

As indicated above, FIG. 4 is provided as an example. Other examples may differ from what is described with respect to FIG. 4.

Figure 5:
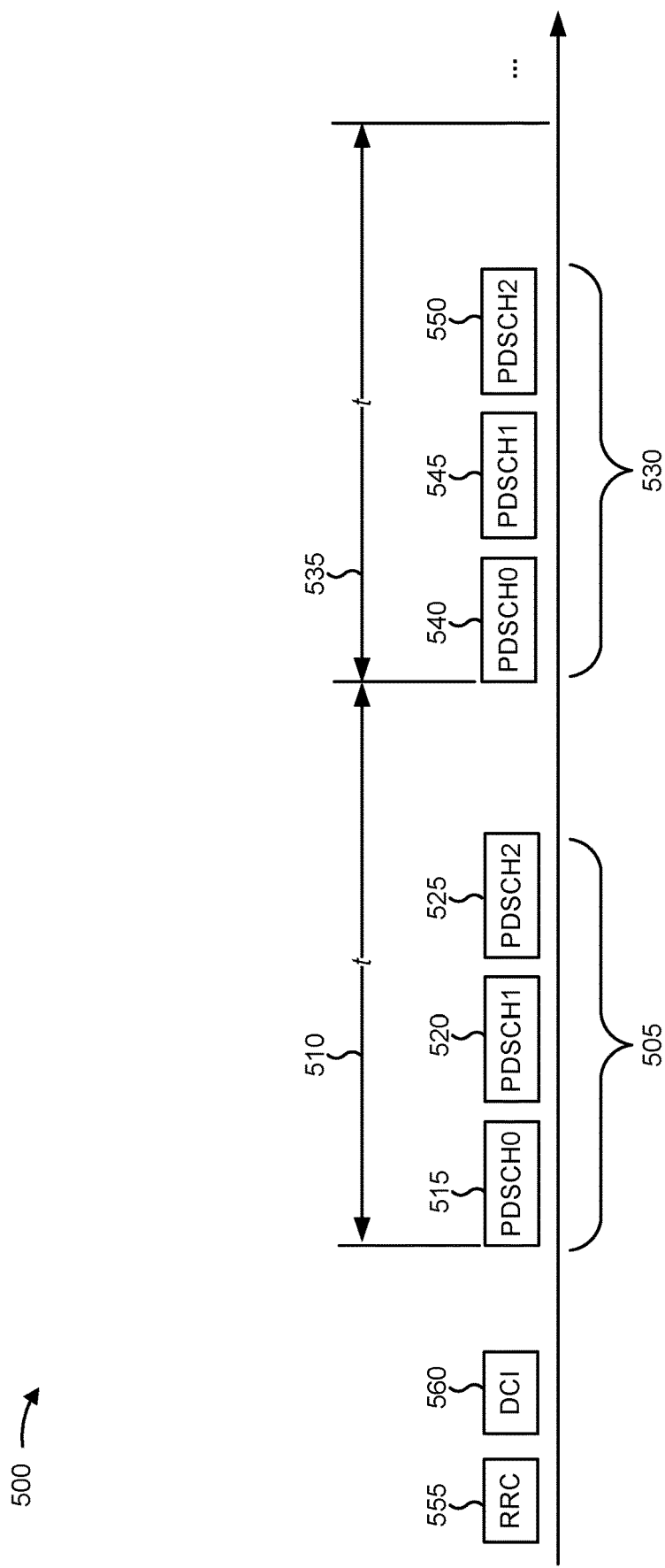
FIG. 5 is a diagram illustrating an example of semi-persistently scheduling a burst of PDSCH communications, in accordance with the present disclosure.

FIG. 5 is a diagram illustrating an example 500 of semi-persistently scheduling a burst of PDSCH communications, in accordance with the present disclosure.

One method to reduce control overhead is to implement semi-persistent scheduling (SPS). SPS may involve scheduling of one or more resources or channels such that the resources or channels reoccur with a certain periodicity without requiring a control message or other configuration communication prior to each resource or channel. More particularly, SPS communications may include periodic downlink communications that are configured for a UE, such that the base station does not need to send separate DCI to schedule each downlink communication, thereby conserving signaling overhead. In some aspects, a base station utilizing high frequency carriers may semi-persistently schedule a PDSCH (sometimes referred to as a single-PDSCH SPS) within each configured period. To do so, the base station may configure the single-PDSCH SPS using an SPS configuration in a radio resource control (RRC) message, and then subsequently trigger the single-PDSCH SPS using an activation message, such as a single downlink control information (DCI) message, sometimes referred to as an SPS activation DCI. This type of SPS, which utilizes an SPS configuration RRC message and an SPS activation DCI, may be referred as type 2 SPS. In another type of SPS configuration, which may be referred as type 1 SPS, the base station may configure and activate an SPS through a single RRC message without an SPS activation DCI, with the RRC message containing all parameters for the SPS and also activating the SPS. While the description may use type 2 SPS as an example, the disclosure and techniques discussed herein apply equally to type 1 SPS.

The SPS configuration may indicate a resource allocation associated with PDSCH communications (e.g., in a time domain, frequency domain, spatial domain, and/or code domain) and a periodicity at which the resource allocation is repeated, resulting in periodically reoccurring scheduled SPS occasions (e.g., occasions for potential PDSCH transmissions) for the UE. The SPS activation DCI may indicate communication parameters, such as an MCS, a resource block (RB) allocation, and/or antenna ports, for the single-PDSCH SPS communications to be transmitted in the scheduled SPS occasions. The UE may begin monitoring the SPS occasions (e.g., may attempt to decode a PDSCH communication on the SPS occasions) based at least in part on receiving the SPS activation DCI. For example, beginning with a next scheduled SPS occasion subsequent to receiving the SPS activation DCI, the UE may monitor the scheduled SPS occasions to decode PDSCH communications using the communication parameters indicated in the SPS activation DCI. The UE may refrain from monitoring configured SPS occasions prior to receiving the SPS activation DCI. A base station may implement the above-described single-PDSCH SPS technique to reduce control overhead because only a single SPS activation DCI is necessary to trigger the reoccurring PDSCH communication, rather than providing a DCI communication for each instance of the PDSCH communication.

To further reduce control overhead for purposes of high frequency communications, a base station may semi-persistently schedule multiple reoccurring PDSCH communications, sometimes referred to as multi-PDSCH SPS. For example, in FIG. 5, three PDSCH communications (e.g., PDSCH0, PDSCH1, and PDSCH2), referred to collectively as a burst of PDSCH communications, are semi-persistently scheduled to reoccur every PDSCH period t. In some aspects, the PDSCH period, t, may correspond to a transmission time interval (TTI) for the communication scheme. A burst of PDSCH communications includes multiple associated PDSCH communications within one period configured by a single RRC message, with the multiple PDSCH communications collectively activated by a single activation message (e.g., SPS activation DCI) and deactivated by a single deactivation message (e.g., SPS deactivation DCI). Thus, a first burst of PDSCH communications 505 occurs in a first time period 510 and includes three associated PDSCH communications: a first occurrence of PDSCH0 indicated by reference number 515, a first occurrence of PDSCH1 indicated by reference number 520, and a first occurrence of PDSCH2 indicated by reference number 525. A second burst of PDSCH communications 530 occurs in a second time period 535 and also includes three associated PDSCH communications: a second occurrence of PDSCH0 indicated by reference number 540, a second occurrence of PDSCH1 indicated by reference number 545, and a second occurrence of PDSCH2 indicated by reference number 550.

To configure and schedule the multi-PDSCH SPS, the base station may use a combination of RRC and DCI signaling. For example, the base station may initially configure the multi-PDSCH SPS using an RRC message, as indicated by reference number 555. Similar to single-PDSCH SPS, the SPS configuration in this instance may indicate a resource allocation associated with the burst of PDSCH communications (e.g., in a time domain, frequency domain, spatial domain, and/or code domain) and a periodicity at which the resource allocation is repeated, resulting in periodically reoccurring scheduled SPS occasions for the UE. For type 1 SPS, the RRC message 555 may contain all configuration parameters for the SPS and may also activate the SPS. For type 2 SPS, the RRC message 555 may contain a subset of configuration parameters for the SPS. The base station may thereafter trigger the multi-PDSCH SPS using a SPS activation DCI, as indicated by reference number 560. The SPS activation DCI 560 may indicate any configuration parameters not included in the RRC message 555, and/or the SPS activation DCI 560 may include communication parameters, such as an MCS, an RB allocation, and/or antenna ports, for the burst of PDSCH communications to be transmitted in the scheduled SPS occasions (e.g., the first burst of PDSCH communications 505, the second burst of PDSCH communications 530, and so on). The burst of PDSCH communications may thereafter continue to repeat with a periodicity of t until the base state provides a termination DCI or similar message signaling that the multi-PDSCH SPS should be terminated. In this regard, control overhead is further reduced as compared to a single-PDSCH SPS, because a single SPS activation DCI 560 triggers reoccurring burst of PDSCH communications (e.g., the first burst of PDSCH communications 505, the second burst of PDSCH communications 530, and so on), each including multiple associated PDSCH communications (e.g., PDSCH0, PDSCH1, and PDSCH2), rather than requiring a separate DCI to trigger each reoccurring PDSCH communication.

Nonetheless, each individual PDSCH communication within the burst of PDSCH communications (e.g., PDSCH0, PDSCH1, and PDSCH2) may involve some degree of control overhead because each PDSCH communication will have resources allocated for one or more reference signals contained therein, such as a DMRS. At a high level, a DMRS associated with a PDSCH communication is a reference signal used by the UE for decoding the PDSCH communication and, more particularly, is used for channel estimation as part of coherent demodulation of the PDSCH communication. For a rapidly changing signal, such as use cases with high mobility and low channel coherence, including a DMRS in each PDSCH may be beneficial so that the UE can accurately estimate the channel and decode each PDSCH communication. However, in applications with little or no mobility and/or in which the channel is not frequently changing (e.g., applications with high channel coherence), such as the low mobility UE 120a and UE 120b described in connection with FIG. 4, including a DMRS in each PDSCH communication unnecessarily increases control overhead and inefficiently allocates resources. This results in large control overhead, leading to increased power consumption for control signaling and thus less power available for data transmission, resulting in decreased throughput and capacity, increased latency, and decreased coverage.

According to some aspects of the present disclosure, one or more DMRSs in a multi-PDSCH SPS burst are omitted in order to reduce control overhead and thus increase resources available for data transmission or other communication. This may be particularly effective for high frequency communications implemented in low-mobility use cases because the fixed UE results in high channel coherence (e.g., the channel is relatively stable) and thus the DMRS in each PDSCH communication may become redundant and unnecessary relative to including DMRS in a subset of the PDSCH communications of the burst of PDSCH communications. More particularly, in some aspects a base station may transmit an indication of a DMRS pattern for a burst of PDSCH communications. The DMRS pattern may indicate a pattern of DMRSs transmitted in the burst of PDSCH communications, such as that fewer than all of the PDSCH communications within the burst of PDSCH communications and/or fewer than all bursts of PDSCH communications of multiple reoccurring bursts of PDSCH communications should include a corresponding DMRS. For example, the indication may indicate that at least one PDSCH communication in the burst of PDSCH communications will not include a DMRS. Or the indication may indicate that at least one burst of PDSCH communications out of multiple reoccurring bursts of PDSCH communications will not include a DMRS. Or the indication may indicate that no PDSCH communications and/or bursts of PDSCH communications should include a DMRS, and instead the DMRS will be provided in a standalone DMRS transmission and/or on an as-needed basis. Reducing the number of DMRSs received in each burst or omitting one or more DMRSs in each burst reduces the control overhead, resulting in decreased power consumption for control signaling and thus increased power available for data transmission, resulting in increased throughput and capacity, decreased latency, and increased coverage.

As indicated above, FIG. 5 is provided as an example. Other examples may differ from what is described with respect to FIG. 5.

Figure 6:
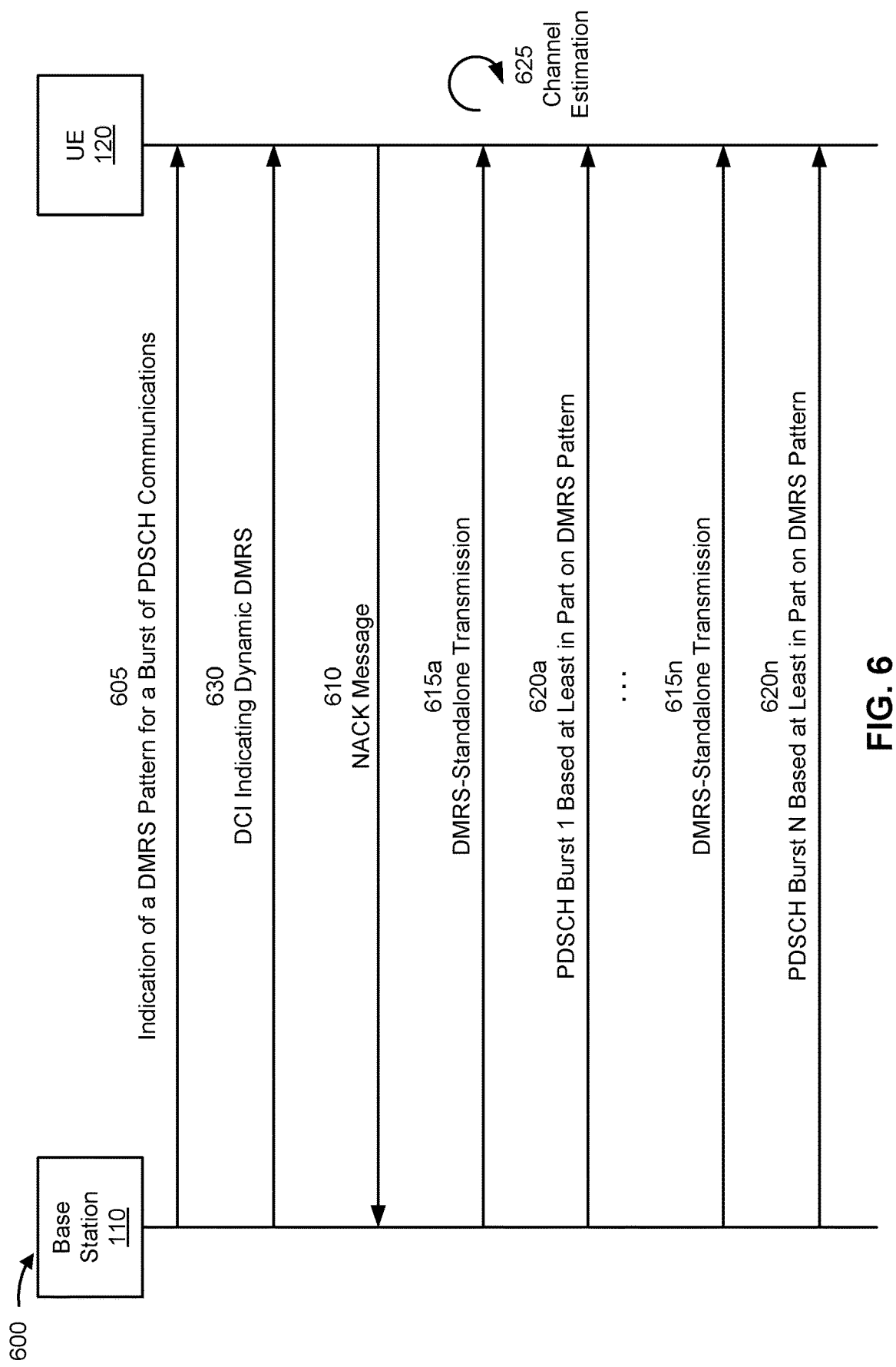
FIG. 6 is a diagram illustrating an example associated with indicating a DMRS pattern for a burst of PDSCH communications, in accordance with the present disclosure.

FIG. 6 is a diagram illustrating an example 600 associated with indicating a DMRS pattern for a burst of PDSCH communications, in accordance with the present disclosure. As shown in FIG. 6, a base station 110 and a UE 120 may communicate with one another.

As shown by reference number 605, the base station 110 may transmit, to the UE 120, an indication of a DMRS pattern for a burst of PDSCH communications. Again, the burst of PDSCH communications may include multiple associated PDSCH communications semi-persistently scheduled by a single RRC message or similar communication to reoccur within a period of the burst of PDSCH communications. For example, as described in connection with FIG. 5, in some aspects the burst of PDSCH communications may include three associated PDSCH communications (e.g., PDSCH0, PDSCH1, and PDSCH2), and may reoccur every t period of time, which, in some aspects, may be 20 ms. For example, all of the three associated PDSCH communications may be transmitted in a time period t, as well as in a time period 2t, and so on. In some aspects, greater or fewer PDSCH communications (e.g., one or more) may occur in a burst of PDSCH communications, and the period of the burst of PDSCH communications may be more or less than 20 ms without departing from the scope of the disclosure. The indication provided at reference number 605 may be provided via any desired signaling and in some aspects may be provided via an RRC message establishing and/or activating the multi-PDSCH SPS (e.g., RRC message 555 in FIG. 5), or a DCI message activating the multi-PDSCH SPS (e.g., SPS activation DCI 560 in FIG. 5), or another DCI message, as will be described in more detail below.

The DMRS pattern may be configured such that fewer than all PDSCH communications of the burst of PDSCH communications include a DMRS, which reduces control overhead for the burst of PDSCH communications as a whole. For example, in implementations of mmW communications or similar high frequency communications in which there may be low mobility and high channel coherence, including a DMRS in each PDSCH may be redundant and inefficient. Thus, the DMRS pattern may indicate that a corresponding DMRS is included in fewer than all PDSCH communications of a burst of PDSCH communications, or that a corresponding DMRS is included in fewer than all bursts of PDSCH communications of multiple bursts. Additionally, or alternatively, the DMRS pattern may indicate that a DMRS is not included in any PDSCH communications of a multi-PDSCH SPS but instead is transmitted separately from the PDSCH communications of the multi-PDSCH SPS, either regularly or dynamically scheduled as needed. In this way, less control overhead is necessary for the multiple PDSCH communications and the UE 120 may perform estimation of the relatively stable and coherent channel less often, reducing energy consumption by the UE. The low mobility, high channel coherence example described above is merely one example implementation of the aspects described herein, and in other aspects, features of the technologies described herein may be employed in other wireless communication systems, such as systems operating in low frequency bands (e.g., sub-6 GHz bands, FR1, etc.) and/or implementations in which the UE 120 has high mobility.

In some aspects, the indication of the DMRS pattern provided at reference number 605 may indicate that at least one, but not all, of the PDSCH communications of each burst of PDSCH communications includes a DMRS (e.g., a corresponding DMRS for each PDSCH communication that includes a DMRS). For example, and returning to FIG. 5, the DMRS pattern may indicate that PDSCH0 should include a DMRS, but that no other PDSCH communications (e.g., PDSCH1 and PDSCH2) include a DMRS. In such aspects, the first instance of the PDSCH0 communication (indicated by reference number 515) in the first burst of PDSCH communications 505 will include the DMRS, but the first instance of the PDSCH1 communication and the PDSCH2 communication (indicated by reference numbers 520 and 525, respectively) will not include corresponding DMRSs (e.g., the PDSCH1 communication will not include a DMRS corresponding to the PDSCH1 communication, and the PDSCH2 communication will not include a DMRS corresponding to the PDSCH2 communication). Similarly, the second instance of the PDSCH0 communication (indicated by reference number 540) in the second burst of PDSCH communications 530 will include a corresponding DMRS, but the second instance of the PDSCH1 communication and the PDSCH2 communication (indicated by reference numbers 545 and 550, respectively) will not include corresponding DMRSs. This may be beneficial when the channel coherence is longer than one SPS period (e.g., t in FIG. 5), because providing a DMRS for each PDSCH communication SPS period is redundant and inefficient.

In some aspects, the DMRS pattern may indicate which PDSCH communications of a burst of PDSCH communications include a corresponding DMRS by using a bitmap. For example, the indication of the DMRS pattern provided at reference number 605 may be provided by an RRC communication (e.g., RRC message 555) or a DCI communication (e.g., SPS activation DCI 560) indicating a N-bit 0/1 sequence or bitmap (which, in some aspects, may be referred to as DmrsPresenceBitMap). The bitmap indicates the presence of respective DMRSs within a burst of PDSCH communications by using a 1 or 0. For example, a bitmap (e.g., DmrsPresenceBitMap) value of 100000 may indicate that only a first PDSCH communication out of a six-PDSCH-communication burst of PDSCH communications includes a corresponding DMRS, while a bitmap value of 100100 may indicate that every third PDSCH communication out of a six-PDSCH-communication burst of PDSCH communications includes a corresponding DMRS, and so forth. In some aspects, when the bitmap is absent from the signaling provided at reference number 605, a DMRS may be provided in each PDSCH communication of the burst of PDSCH communications.

Additionally, or alternatively, in some aspects the indication of the DMRS pattern provided at reference number 605 may indicate an intra-burst periodicity parameter (sometimes referred to as DmrsPresencePeriod) associated with the DMRS pattern. The intra-burst periodicity parameter may indicate a number of consecutive PDSCH communications, with a corresponding DMRS being included in only one PDSCH communication out of the number of consecutive PDSCH communications. In such implementations, for each burst of PDSCH communications, a DMRS is present in each 0-th PDSCH communication occasion, each DmrsPresencePeriod-th PDSCH communication occasion, each 2×DmrsPresencePeriod-th PDSCH communication occasion, and so forth. Returning to the example of a six-PDSCH-communication burst of PDSCH communications, an intra-burst periodicity parameter of 3 would thus indicate that the first PDSCH communication (sometimes indexed as PDSCH0, as in FIG. 5) and fourth PDSCH communication (sometimes indexed as PDSCH3) will both include a corresponding DMRS, but that the other four PDSCH communications (e.g., the second, third, fifth, and sixth PDSCH communications, sometimes indexed as PDSCH1, PDSCH2, PDSCH4, and PDSCH5, respectively) will not include a corresponding DMRS. In some aspects, when the intra-burst periodicity parameter is absent or else is equal to a configured special value in the indication of the DMRS pattern provided at reference number 605, a DMRS may be provided in each PDSCH communication of the burst of PDSCH communications.

In some aspects, the indication of the DMRS pattern provided at reference number 605 may indicate that fewer than all of the bursts of PDSCH communications include the DMRS. This may be particularly beneficial for implementations in which channel coherence spans more than one SPS time period (e.g., t in FIG. 5), and thus it would be redundant or inefficient to perform channel estimation for each burst of PDSCH communications. For example, and returning to FIG. 5, the indication of the DMRS pattern may indicate that every other burst of PDSCH communications should include a DMRS, and thus the first burst of PDSCH communications 505 would include a DMRS, but the second burst of PDSCH communications 530 would not include a DMRS. A third burst of PDSCH communications (not shown) would then include a DMRS, while a fourth burst of PDSCH communications (not shown) would not include a DMRS, and so forth.

In some aspects, the indication of the DMRS pattern provided at reference number 605 may indicate which bursts of PDSCH communications of multiple bursts of PDSCH communications include a corresponding DMRS using an inter-burst periodicity parameter (which, in some aspects, may be referred to as a periodicity integer or T). That is, the inter-burst periodicity parameter may indicate the presence of a DMRS within one or more bursts of PDSCH communications of multiple bursts of PDSCH communications. More particularly, the inter-burst periodicity parameter (e.g., T) may indicate a number of consecutive bursts of PDSCH communications, with a DMRS being included in only one burst of PDSCH communications out of the number of consecutive bursts of PDSCH communications. In such implementations, a DMRS is present in each 0-th burst of PDSCH communications occasion, each T-th burst of PDSCH communications occasion, each 2×T-th burst of PDSCH communications occasion, and so forth. In this implementation, an inter-burst periodicity parameter (e.g., T) of 2 would thus indicate that the first burst of PDSCH communications (e.g., the first burst of PDSCH communications 505 in FIG. 2), a third burst of PDSCH communications (not shown in FIG. 5, but which would immediately follow the second burst of PDSCH communications 530), and so forth will include a DMRS, but that the other bursts of PDSCH communications (e.g., the second burst of PDSCH communications 530, and a fourth burst of PDSCH communications, and so forth) will not include a DMRS. In some aspects, when the inter-burst periodicity parameter (e.g., T) is absent or else is equal to a configured special value in the indication of the DMRS pattern provided at reference number 605, a DMRS may be provided in each burst of PDSCH communications.

In some aspects, the indication of the DMRS pattern provided at reference number 605 may indicate that none of the PDSCH communications of the burst of PDSCH communications includes a corresponding DMRS, that none of the bursts of PDSCH communications of the multiple bursts of PDSCH communications include a corresponding DMRS, and/or that a DMRS is transmitted separately from the PDSCH communications and/or bursts of PDSCH communications. For example, the indication of the DMRS pattern provided at reference number 605 may indicate that a DMRS-standalone transmission (sometimes referred to a DMRS-only transmission) will be provided ahead of a burst of PDSCH communications, and thus no PDSCH communications in the burst of PDSCH communications will carry a DMRS. Additionally, or alternatively, in some aspects the indication of the DMRS pattern provided at reference number 605 may indicate that a DMRS will be dynamically scheduled later using a DCI or similar, as will be described in more detail below in connection with reference number 630. In implementations in which a bitmap (e.g., DmrsPresenceBitMap) or a periodicity parameter (e.g., DmrsPresencePeriod or T) is employed, the indication of the DMRS-standalone transmission may be indicated using an all zero bitmap (e.g., 000000 for a six PDSCH communication burst of PDSCH communications), a zero periodicity parameter (e.g., 0), or other configured special value of the bitmap or periodicity parameter.

In some aspects, the DMRS-standalone transmission may be transmitted in a slot immediately preceding a slot in which a first PDSCH communication of the burst of PDSCH communications is located. Returning to the example provided in FIG. 5, in this example the DMRS would be provided in a slot immediately preceding the slot in which the first instance of the first PDSCH communication, as indicated by reference number 515, is provided, and/or in a slot immediately preceding the slot in which the second instance of the first PDSCH communication, as indicated by reference number 540, is provided, and so on.

Moreover, in some aspects the symbol and/or duration of the DMRS within the DMRS-standalone transmission will mimic the DMRS symbol and/or duration in a start and length indicator value (SLIV) of the first PDSCH communication occurrence (e.g., PDSCH0) if the first PDSCH communication occurrence would carry a DMRS (referred to herein as a configured DMRS location in the slot including the first PDSCH communication). Put another way, the indication of the DMRS pattern may indicate that the DMRS is transmitted in a first slot that immediately precedes a second slot in which a first PDSCH communication, of the multiple PDSCH communications, begins, and that the DMRS is transmitted at a symbol location within the first slot that corresponds to a configured DMRS symbol location, in the second slot, of the first PDSCH communication (such as using the time and frequency resources of the configured DMRS location as if the configured DMRS location were in the first slot).

In some aspects, the location of the DMRS within the DMRS-standalone transmission may be within the last one or more symbols of the slot immediately preceding the slot containing the first PDSCH communication (e.g., PDSCH0) of the burst of PDSCH communications. Moreover, the number of symbols occupied by the DMRS may be equal to the number of the DMRS symbols in the SLIV of the first PDSCH communication occurrence (e.g., PDSCH0) if that occurrence would carry the DMRS (e.g., the number of symbols occupied by the configured DMRS location in the slot including the first PDSCH communication). Or, put another way, in some aspects the DMRS is transmitted in one or more last symbols of the first slot and in a same number of DMRS symbols in the first slot as a number of configured DMRS symbols, in the second slot, of the first PDSCH communication.

In some aspects, the DMRS-standalone transmission may be transmitted in the same slot as the first PDSCH communication occurrence (e.g., PDSCH0) if the slot containing the first PDSCH communication occurrence includes one or more symbols in addition to those being used for the SLIV of the first PDSCH communication. Put another way, in some aspects the first PDSCH communication (e.g., PDSCH0), of the multiple PDSCH communications, occurs within a first set of symbols within a slot, and the DMRS is transmitted in a second set of symbols, within the slot, different than the first set of symbols.

In some aspects, the base station 110 may power boost the DMRS-standalone transmission, which may improve channel estimation. Thus, in such aspects a transmission power per resource element associated with the DMRS in the DMRS-standalone transmission is greater than a transmission power per resource element associated with the burst of PDSCH communications and/or other PDSCH communications. Moreover, in some aspects, even when one or more PDSCH communications of the burst of PDSCH communications does not include the DMRS, each PDSCH communication may nonetheless include other reference signaling, such as a phase tracking reference signal (PTRS) or another reference signal.

In some aspects, there may be no DMRSs transmitted within one or more bursts of a PDSCH communications. For example, the indication of the DMRS pattern for the burst of PDSCH communications shown by reference number 605 may indicate that no corresponding DMRS will be provided for one or more forthcoming bursts of PDSCH communications. In such instances, the DMRS of other, earlier transmissions may be used to estimate the channel for the corresponding burst of PDSCH communications. More particularly, the DMRS associated with a previous PDSCH may be used to estimate the channel if the frequency domain resource assignment (FDRA) of the previously received DMRS is the same as the FDRA of the forthcoming burst of PDSCH communications. In some aspects, if the UE 120 did not previously receive a suitable DMRS, such as if no DMRS has been previously received or if the previously received DMRS does not share the same FDRA as the burst of PDSCH communications, then the UE 120 may transmit a negative acknowledgement (NACK) message to the base station 110, as indicated by reference number 610. In some aspects, in response to receiving the NACK message, the base station 110 may configure a revised DMRS pattern or transmit some suitable DMRS standalone transmissions for the burst of PDSCH communications.

After transmitting the indication of the DMRS pattern at reference number 605, and after receiving any applicable NACK message at reference number 610, in aspects employing standalone DMRS (e.g., when the indication of the DMRS pattern provided at reference number 605 indicates that the DMRS will be transmitted separately from the PDSCH), the base station 110 may transmit the DMRS-standalone transmission as shown at reference number 615. Additionally, or alternatively, the base station 110 may transmit the burst of PDSCH communications based at least in part on the DMRS pattern, as shown at reference number 620. More particularly, the base station 110 may transmit the burst of PDSCH communications with fewer than all PDSCH communications including a DMRS, in accordance with the indication of the DMRS pattern provided at reference number 605. Moreover, when the burst of PDSCH communications is scheduled to reoccur with a given periodicity (e.g., when the burst of PDSCH communications is a multi-PDSCH SPS, as described in connection with FIG. 5), the base station 110 may periodically transmit the reoccurring bursts of PDSCH communications including, if applicable, transmitting subsequent DMRS-standalone transmissions including the DMRS (as indicated by reference number 615n), and transmitting subsequent bursts of PDSCH communications in accordance with the DMRS pattern (as indicated by reference number 620n). As the UE 120 receives the DMRS, either as a standalone transmission as indicated by reference number 615 or within one or more PDSCH communications of the bursts of PDSCH communications as indicated at reference number 620, the UE 120 may periodically perform channel estimation, as indicated by reference number 625, and/or use the DMRS for other purposes such as deriving the power of the corresponding PDSCH communication and so forth.

In aspects in which one or more DMRSs are included in periodic PDSCH communications (e.g., either within a burst of PDSCH communications or across multiple bursts of PDSCH communications), the transmitted bursts of PDSCH communications may be configured such that each transmitted PDSCH communication either includes a corresponding DMRS or such that a DMRS was received at the previously available DMRS-bearing position. This may ensure that the UE 120 is able to adequately estimate the channel for each PDSCH communication and that the channel estimation and/or other purposes and to ensure the channel has not otherwise become stale (e.g., has become no longer suitable for accurate channel estimation) between PDSCH communications. Thus, if the burst of PDSCH communications shown in FIG. 5 were configured such that only the first PDSCH communication 515 and 540 of each respective burst of PDSCH communications 505 and 530 included a DMRS, the first instances of the burst of PDSCH communications (e.g., PDSCH0) may be transmitted even when there is no data to transmit in the corresponding channel to ensure that the UE 120 receives the DMRS. Returning to the example shown in FIG. 5, if there is no data to transmit in the second instance of the first PDSCH communication (e.g., PDSCH0), indicated by reference number 540, a DMRS may nonetheless be transmitted in the PDSCH communication (e.g., the PDSCH communication may be transmitted without any data resource elements (REs)) so that the UE 120 receives the DMRS to estimate the channel for the subsequent PDSCH communications in the burst of PDSCH communications (e.g., the second instance of the second PDSCH communication (e.g., PDSCH1) indicated by reference number 545 and the second instance of the third PDSCH communication (e.g., PDSCH2) indicated by reference number 550). In some aspects, the DMRS in the DMRS-bearing PDSCH communications will follow the legacy configuration of the DMRS (e.g., the configuration for the DMRS if the PDSCH were not part of a configured multi-PDSCH SPS and/or if the UE 120 did not receive any indication of the DMRS pattern).

In some aspects, the indication of the DMRS pattern for the burst of PDSCH communications, as shown by reference number 605, may indicate that the distribution of DMRSs includes both a periodicity across multiple bursts of PDSCH communications and a periodicity within the corresponding DMRS-bearing burst of PDSCH communications. For example, the indication of the DMRS pattern may indicate that a DMRS should be present in one out of every T bursts of PDSCH communications (e.g., by using an inter-burst periodicity parameter (e.g., T) or similar indication), sometimes referred to as a DMRS-bearing burst of PDSCH communications, and also indicate that a DMRS should be present in fewer than all of the PDSCH communications within the DMRS-bearing bursts of PDSCH communications (e.g., by using an intra-burst periodicity parameter (e.g., DmrsPresencePeriod), a bitmap (e.g., DmrsPresenceBitMap), or similar indication), sometimes referred to as a DMRS-bearing PDSCH communication.

For example, if the inter-burst periodicity parameter (e.g., T) as well as the intra-burst periodicity parameter or bitmap (e.g., DmrsPresencePeriod or DmrsPresenceBitMap, respectively) are present in the indication of the DMRS pattern, DMRS will be present in one out of every T bursts of PDSCH communications, but in fewer than all of the PDSCH communications corresponding to the intra-burst periodicity parameter or bitmap. If the inter-burst periodicity parameter is present but the intra-burst periodicity parameter or bitmap is not present, a DMRS will be present in one out of every T bursts of PDSCH communications, and furthermore in each one of the PDSCH communications within the DMRS-bearing burst of PDSCH communications. If the intra-burst periodicity parameter or bitmap is present but the inter-burst periodicity parameter is not present, a DMRS will be present in each burst of PDSCH communications, but in fewer than all of the PDSCH communications corresponding to the intra-burst periodicity parameter or bitmap. And if neither of the inter-burst periodicity parameter nor the intra-burst periodicity parameter or bitmap are present, all PDSCH communications in each burst of PDSCH communications will include a DMRS (e.g., no DMRS sharing or bundling will occur).

In this regard, certain PDSCH communications may include a DMRS in one burst of PDSCH communications but not in another burst of PDSCH communications. For example, and returning to FIG. 5, if the indication of the DMRS pattern indicates that a DMRS should only be included in the first PDSCH communication of every other burst of PDSCH communications, a DMRS will be included in the first instance of the first PDSCH communication (e.g., PDSCH0), as indicated by reference number 515, but will not be included in the second instance of the first PDSCH communication, as indicated by reference number 540. In some aspects, both instances of the first PDSCH communication (e.g., the first instance indicated by reference number 515 and the second instance indicated by reference number 540), may include the same SLIV, FDRA, MCS, and so forth, but each may have a different transport block size (TBS) because the first instance of the first PDSCH communication includes a DMRS, while the second instance of the first PDSCH communication will not include a DMRS.

More particularly, in some aspects, the REs associated with a DMRS, but which are no longer needed for receiving a DMRS due to the indicated DMRS pattern, may be counted for purposes of determining the transport block size (TBS) of the corresponding PDSCH communication. In such instances, the TBS of the second instance of the first PDSCH communication, indicated by reference number 540, will be larger than the TBS of the first instance of the first PDSCH communication, indicated by reference number 515, because the first instance uses some REs for a corresponding DMRS while the second instance does not. However, in some other aspects, the REs associated with a DMRS, even those which are no longer needed for receiving a DMRS, are not counted for purposes of determining the TBS of the corresponding PDSCH communication. Instead, those REs may be used to increase coding redundancy for the transport block and thus improve decoding reliability. In such implementations, the TBS of both instances of the first PDSCH communication (e.g., the first instance as shown by reference number 515 and the second instance as shown by reference number 540) will be the same. In some aspects, the base station 110 may provide a configuration to the UE 120 indicating whether the REs associated with the DMRS, which are no longer needed for receiving the DMRS, should be counted for purposes of determining the block size (TBS) of the non-DMRS-bearing PDSCH communications.

In some aspects, the base station 110 may indicate that a DMRS is to be dynamically provided to the UE 120, with the indication being provided from RRC signaling (e.g., RRC message 555 in FIG. 5), DCI signaling (e.g., SPS activation DCI 560 in FIG. 5) establishing and/or activating the multi-PDSCH SPS, or some other signaling. For example, instead of or in addition to any of the DMRSs indicated by the DMRS pattern, the base station 110 may dynamically schedule one or more DMRSs (sometimes referred to as dynamic DMRS) using a DCI communication, as indicated by reference number 630. In such implementations, the base station 110 may signal to the UE 120 that the DCI communication indicating the dynamic DMRS may be forthcoming. For example, an RRC message (e.g., RRC message 555 in FIG. 5), DCI message (e.g., SPS activation DCI 560 in FIG. 5), or similar communication establishing the multi-PDSCH SPS may include a parameter indicating that the DCI communication indicating dynamic DMRS may be transmitted based at least in part on certain performance thresholds or similar criteria. The parameter indicating that the DCI communication indicating dynamic DMRS may be transmitted is sometimes referred to as the "dynamic DMRS parameter" and/or SPSDynamicDMRS.

The dynamic DMRS parameter (e.g., SPSDynamicDMRS) may be provided in addition to a configured DMRS pattern within the RRC message (e.g., RRC message 555 in FIG. 5) or DCI message (e.g., SPS activation DCI 560 in FIG. 5) establishing the multi-PDSCH SPS. For example, the signaling that includes the dynamic DMRS parameter may also include a bitmap, periodicity parameter, or the like (e.g., DmrsPresenceBitMap, DmrsPresencePeriod, T, or similar parameter) indicating a semi-statically configured DMRS pattern for the multi-PDSCH SPS. In such implementations, the base station 110 may provide DMRSs in accordance with the semi-statically configured DMRS pattern, but may supplement the DMRS pattern with dynamic DMRS or otherwise provide additional DMRSs if channel conditions change or if additional DMRS is needed to properly estimate the channel. Put another way, the signaling from the base station 110 to the UE 120, as indicated by reference number 605, may in some aspects include a semi-statically configured scheduled DMRS pattern (e.g., using a bitmap, periodicity parameter, or similar parameter), or a dynamic DMRS parameter (e.g., SPSDynamicDMRS) indicating that additional DMRSs may be dynamically scheduled, or a combination of the DMRS pattern and the dynamic DMRS parameter.

In aspects in which the dynamic DMRS parameter is provided instead of a semi-statically configured DMRS pattern, the multi-PDSCH SPS may not carry any DMRSs, and instead the UE 120 will only receive one or more DMRSs when it is dynamically scheduled by the base station 110. In such implementations, until the DMRS is dynamically scheduled and received, the UE 120 may use previously transmitted DMRS communications or the like when estimating the channel at reference number 625. And, as described above in connection with reference number 610, if the UE 120 has not previously received adequate DMRSs to perform channel estimation in such instances, the UE 120 may provide the base station 110 a NACK message or similar notification. This may trigger the base station 110 to immediately schedule a DMRS communication so that the UE 120 may perform channel estimation.

The base station 110 may utilize any suitable DCI message, medium access control (MAC) message, or similar communication to schedule the dynamic DMRS. For example, in some aspects the base station 110 may schedule the dynamic DMRS using a DCI message scheduling a retransmission of a transmission of a downlink message associated with a hybrid automatic repeat request (HARQ) process. In such aspects, the transmission of the downlink message associated with the HARQ process may be one that employs the same FDRA, DMRS configuration, rank, and so forth as the multi-PDSCH SPS so that the channel estimated by the UE 120 may be used to decode the PDSCH communications of the multi-PDSCH SPS. For example, the transmission of the downlink message associated with the HARQ process may be one PDSCH communication of the recurring burst of PDSCH communications. In such implementations, the cyclic redundancy check (CRC) of the DCI message may be scrambled with a configured scheduling radio network temporary identifier (CS-RNTI) associated with the UE 120 and/or the multi-PDSCH SPS. Moreover, in some aspects the base station 110 may schedule the dynamic DMRS using the DCI message scheduling the retransmission of the transmission associated with the HARQ process even if the UE 120 previously successfully decoded the PDSCH associated with the HARQ process but nonetheless channel conditions have changed enough that the base station 110 needs to transmit additional DMRSs. Accordingly, the UE 120 may treat the DCI message scheduling the retransmission of the transmission associated with the HARQ process as meaning that the base station 110 did not decode the HARQ feedback correctly, and thus will receive the retransmission associated DMRS and refresh channel estimation accordingly.

Additionally, or alternatively, the base station 110 may schedule the dynamic DMRS using a DCI scheduling a PDSCH communication separate from the multi-PDSCH SPS. In such implementations, the configuration of the new PDSCH communication (e.g., FDRA, rank, DMRS configuration, and similar attributes) may be the same as the configuration of the PDSCH communications of the multi-PDSCH SPS in order to properly estimate the channel. In some aspects, the CRC of the DCI message scheduling the new PDSCH communication may be scrambled with a cell RNTI (C-RNTI) associated with the UE 120 and/or the multi-PDSCH SPS.

Additionally, or alternatively, in some aspects the base station 110 may use a DMRS-specific DCI message to schedule the dynamic DMRS, which in some aspects may be a DMRS-standalone transmission (e.g., the DMRS-standalone transmission indicated by reference number 615). In such implementations, the DMRS-standalone transmission may be configured to include the same FDRA, rank, DMRS configuration, and the like as the PDSCH communications of the multi-PDSCH SPS such that the channel can be accurately estimated by the UE 120.

In some aspects, the DCI message (e.g., a DCI message scheduling a retransmission of a transmission associated with a HARQ process, a DCI message scheduling a PDSCH separate from the multi-PDSCH SPS, a DMRS-specific DCI message, or similar DCI message) may further indicate a period of time that the UE 120 may use the corresponding dynamic DMRS before the channel estimation from the DMRS becomes stale. This period of time is sometimes referred to a lifespan parameter, or LifeSpan. In such implementations, the lifespan parameter may indicate how long the UE 120 may utilize the channel estimation (e.g., as indicated by reference number 625) using the dynamic DMRS scheduled by the DCI message. Thus, the lifespan parameter may indicate a lifespan of channel estimation using parameters derived from a particular dynamic DMRS. In some aspects, the FDRA and rank for the dynamic DMRS may implicitly indicate if the dynamic DMRS can be used for a later PDSCH communication that does not include a corresponding DMRS and/or for a later burst of PDSCH communications in which fewer than all of the PDSCH communications include a corresponding DMRS.

As indicated above, FIG. 6 is provided as an example. Other examples may differ from what is described with respect to FIG. 6.

Figure 7:
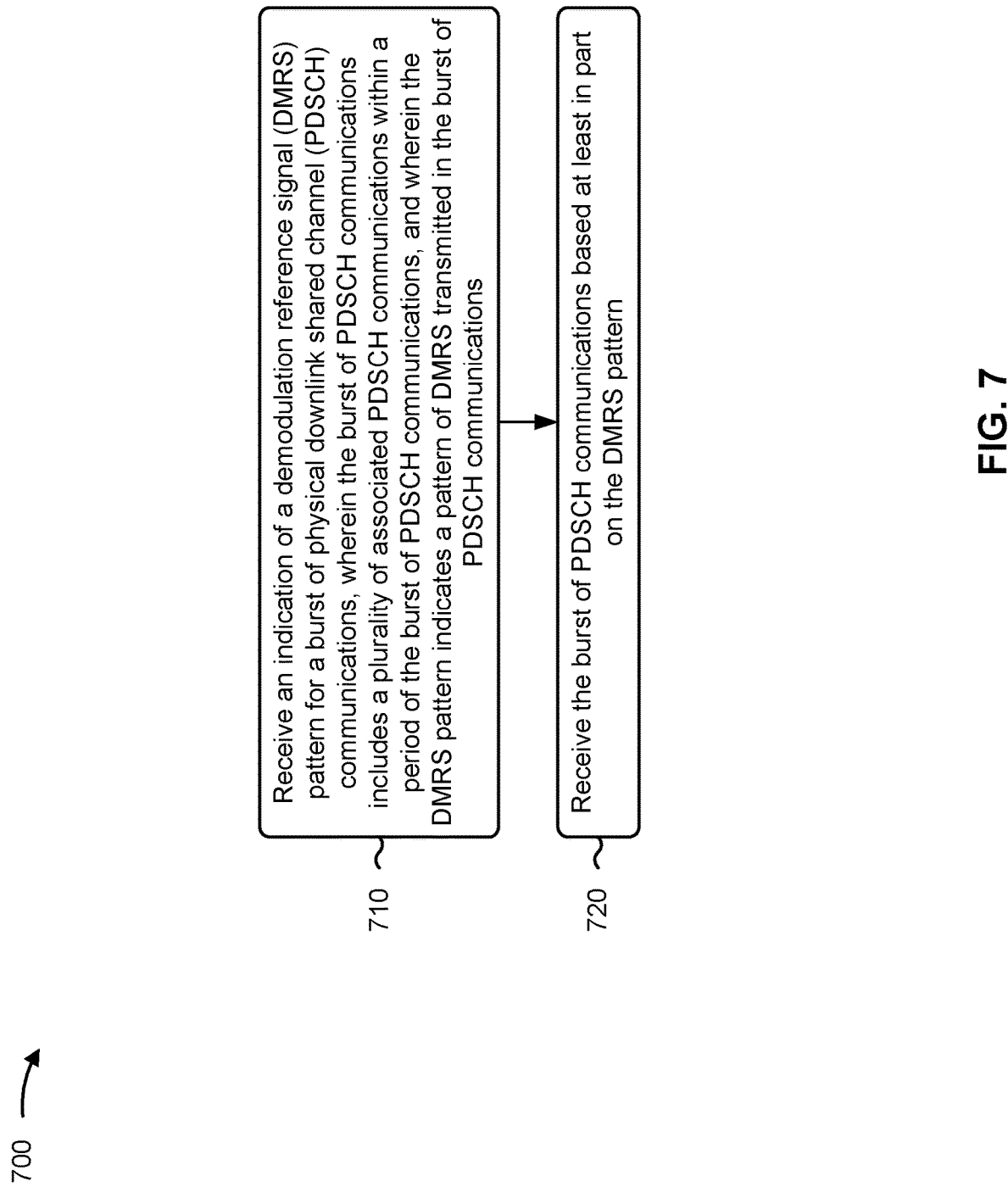
FIG. 7 is a diagram illustrating an example process performed, for example, by a UE, in accordance with the present disclosure.

FIG. 7 is a diagram illustrating an example process 700 performed, for example, by a user equipment (UE), in accordance with the present disclosure. Example process 700 is an example where the UE (e.g., UE 120) performs operations associated with demodulation reference signaling for multi-channel semi-persistent scheduling.

As shown in FIG. 7, in some aspects, process 700 may include receiving an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications (block 710). For example, the UE (e.g., using communication manager 140 and/or reception component 902, depicted in FIG. 9) may receive an indication of a DMRS pattern for a burst of PDSCH communications, wherein the burst of PDSCH communications includes one or more associated PDSCH communications within a period of the burst of PDSCH communications (e.g., an SPS period or PDSCH period), and wherein the DMRS pattern indicates a pattern of DMRS transmitted in the burst of PDSCH communications, as described above.

As further shown in FIG. 7, in some aspects, process 700 may include receiving the burst of PDSCH communications based at least in part on the DMRS pattern (block 720). For example, the UE (e.g., using communication manager 140 and/or reception component 902, depicted in FIG. 9) may receive the burst of PDSCH communications based at least in part on the DMRS pattern, as described above. In some aspects, the UE may derive parameters (e.g., channel estimation parameters, power parameters, or the like) from a DMRS identified based at least in part on the DMRS pattern, and may receive (e.g., demodulate), using the parameters derived from the DMRS, one or more PDSCHs (of the burst) that do not include the DMRS.

Process 700 may include additional aspects, such as any single aspect or any combination of aspects described below and/or in connection with one or more other processes described elsewhere herein.

In a first aspect, the indication of the DMRS pattern indicates that less than all of the one or more associated PDSCH communications of the burst of PDSCH communications include a corresponding DMRS.

In a second aspect, alone or in combination with the first aspect, the indication of the DMRS pattern indicates whether each of the one or more associated PDSCH communications of the burst of PDSCH communications includes a corresponding DMRS.

In a third aspect, alone or in combination with one or more of the first and second aspects, the indication of the DMRS pattern includes a bitmap indicating whether each of the one or more associated PDSCH communications of the burst of PDSCH communications includes the corresponding DMRS.

In a fourth aspect, alone or in combination with one or more of the first through third aspects, the indication of the DMRS pattern indicates that none of the one or more associated PDSCH communications of the burst of PDSCH communications includes a corresponding DMRS.

In a fifth aspect, alone or in combination with one or more of the first through fourth aspects, process 700 includes estimating a channel for the burst of PDSCH communications using a DMRS from a prior PDSCH communication based at least in part on the indication that none of the one or more associated PDSCH communications of the burst of PDSCH communications includes the corresponding DMRS.

In a sixth aspect, alone or in combination with one or more of the first through fifth aspects, process 700 includes determining that no DMRS corresponding to the burst of PDSCH communications has been previously received, and reporting a negative acknowledgement (NACK) message based at least in part on determining that no DMRS corresponding to the burst of PDSCH communications has been previously received.

In a seventh aspect, alone or in combination with one or more of the first through sixth aspects, the indication of the DMRS pattern indicates that a first PDSCH communication, of the one or more associated PDSCH communications, includes the DMRS, wherein the DMRS pattern indicates that a second PDSCH communication, of the one or more associated PDSCH communications, does not include the DMRS, and wherein the first PDSCH communication occurs prior to the second PDSCH communication.

In an eighth aspect, alone or in combination with one or more of the first through seventh aspects, process 700 includes receiving a data transmission in the first PDSCH communication.

In a ninth aspect, alone or in combination with one or more of the first through eighth aspects, process 700 includes receiving a data transmission in the second PDSCH communication based at least in part on receiving the DMRS in the first PDSCH communication.

In a tenth aspect, alone or in combination with one or more of the first through ninth aspects, process 700 includes receiving the DMRS in the first PDSCH communication and receiving no data transmissions in the first PDSCH communication.

In an eleventh aspect, alone or in combination with one or more of the first through tenth aspects, the indication of the DMRS pattern indicates that the DMRS is transmitted separately from all PDSCH communications of the burst of PDSCH communications.

In a twelfth aspect, alone or in combination with one or more of the first through eleventh aspects, the indication of the DMRS pattern indicates that the DMRS is transmitted in a first slot that immediately precedes a second slot in which a first PDSCH communication, of the one or more associated PDSCH communications, begins.

In a thirteenth aspect, alone or in combination with one or more of the first through twelfth aspects, the DMRS is transmitted at a DMRS location within the first slot that corresponds to a configured DMRS location, in the second slot, of the first PDSCH communication.

In a fourteenth aspect, alone or in combination with one or more of the first through thirteenth aspects, the DMRS location and the configured DMRS location are associated with a same set of frequency resources and a same set of symbol indexes.

In a fifteenth aspect, alone or in combination with one or more of the first through fourteenth aspects, the DMRS is transmitted in one or more last symbols of the first slot.

In a sixteenth aspect, alone or in combination with one or more of the first through fifteenth aspects, the DMRS is transmitted in a same number of DMRS symbols in the first slot as a number of configured DMRS symbols, in the second slot, of the first PDSCH communication.

In a seventeenth aspect, alone or in combination with one or more of the first through sixteenth aspects, a first PDSCH communication, of the one or more associated PDSCH communications, occurs within a first set of symbols within a slot, and wherein the indication of the DMRS pattern indicates that the DMRS is transmitted in a second set of symbols within the slot different than the first set of symbols.

In an eighteenth aspect, alone or in combination with one or more of the first through seventeenth aspects, a transmission power per resource element associated with the DMRS is greater than a transmission power per resource element associated with the burst of PDSCH communications.

In a nineteenth aspect, alone or in combination with one or more of the first through eighteenth aspects, each PDSCH communication, of the one or more associated PDSCH communications, includes a corresponding phase tracking reference signal (PTRS).

In a twentieth aspect, alone or in combination with one or more of the first through nineteenth aspects, the indication of the DMRS pattern indicates an intra-burst periodicity parameter indicating whether each of the one or more associated PDSCH communications of the burst of PDSCH communications includes a corresponding DMRS.

In a twenty-first aspect, alone or in combination with one or more of the first through twentieth aspects, the intra-burst periodicity parameter indicates a number of consecutive PDSCH communications, and wherein the DMRS is included in only one PDSCH communication out of the number of consecutive PDSCH communications.

In a twenty-second aspect, alone or in combination with one or more of the first through twenty-first aspects, the indication of the DMRS pattern further indicates a pattern of DMRS transmitted across a plurality of bursts of PDSCH communications.

In a twenty-third aspect, alone or in combination with one or more of the first through twenty-second aspects, the indication of the DMRS pattern indicates that less than all of the plurality of bursts of PDSCH communications are DMRS-bearing bursts of PDSCH communications, and wherein the indication of the DMRS pattern further indicates that less than all of the one or more associated PDSCH communications within each DMRS-bearing burst of PDSCH communications are DMRS-bearing PDSCH communications.

In a twenty-fourth aspect, alone or in combination with one or more of the first through twenty-third aspects, the indication of the DMRS pattern further indicates an inter-burst periodicity parameter indicating whether each of the plurality of bursts of PDSCH communications includes a corresponding DMRS.

In a twenty-fifth aspect, alone or in combination with one or more of the first through twenty-fourth aspects, the inter-burst periodicity parameter indicates a number of consecutive bursts of PDSCH communications, and wherein the DMRS is included in only one burst of PDSCH communications out of the number of consecutive bursts of PDSCH communications.

In a twenty-sixth aspect, alone or in combination with one or more of the first through twenty-fifth aspects, a first burst of PDSCH communications, of the plurality of bursts of PDSCH communications, is associated with a first transport block size (TBS) and includes the DMRS, and wherein a second burst of PDSCH communications, of the plurality of bursts of PDSCH communications, is associated with a second TBS and does not include the DMRS.

In a twenty-seventh aspect, alone or in combination with one or more of the first through twenty-sixth aspects, a number of resource elements, of the second burst of PDSCH communications and associated with the DMRS, are counted for determination of the second TBS.

In a twenty-eighth aspect, alone or in combination with one or more of the first through twenty-seventh aspects, a number of resource elements, of the second burst of PDSCH communications and associated with the DMRS, are not counted for determination of the second TBS.

In a twenty-ninth aspect, alone or in combination with one or more of the first through twenty-eighth aspects, process 700 includes receiving a configuration indicating whether a number of resource elements, of the second burst of PDSCH communications and associated with the DMRS, are counted for determination of the second TBS.

In a thirtieth aspect, alone or in combination with one or more of the first through twenty-ninth aspects, the indication of the DMRS pattern is provided via at least one of a configuration of the burst of PDSCH communications, or activation downlink control information (DCI) for the burst of PDSCH communications.

In a thirty-first aspect, alone or in combination with one or more of the first through thirtieth aspects, the indication of the DMRS pattern indicates that none of the one or more associated PDSCH communications of the burst of PDSCH communications includes a corresponding DMRS, and wherein the DMRS is transmitted in a downlink transmission scheduled by a downlink control information (DCI) communication.

In a thirty-second aspect, alone or in combination with one or more of the first through thirty-first aspects, the DCI communication schedules a retransmission of a transmission of one of the one or more associated PDSCH communications of the burst of PDSCH communications, wherein the retransmission is associated with a same DMRS configuration as the burst of PDSCH communications.

In a thirty-third aspect, alone or in combination with one or more of the first through thirty-second aspects, the DCI communication schedules a PDSCH communication that is not included in the burst of PDSCH communications, and wherein a DMRS configuration of the PDSCH communication that is not included in the burst of PDSCH communications matches a DMRS configuration of the burst of PDSCH communications.

In a thirty-fourth aspect, alone or in combination with one or more of the first through thirty-third aspects, the DCI communication schedules a DMRS only transmission, and wherein a DMRS configuration of the DMRS only transmission matches a DMRS configuration of the burst of PDSCH communications.

In a thirty-fifth aspect, alone or in combination with one or more of the first through thirty-fourth aspects, the DCI communication further indicates a length of time in which to use the DMRS for channel estimation.

In a thirty-sixth aspect, alone or in combination with one or more of the first through thirty-fifth aspects, process 700 includes receiving a configuration indicating whether additional DMRS should be included in the burst of PDSCH communications, and receiving the burst of PDSCH communications based at least in part on the DMRS pattern and the configuration indicating whether the additional DMRS should be included in the burst of PDSCH communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
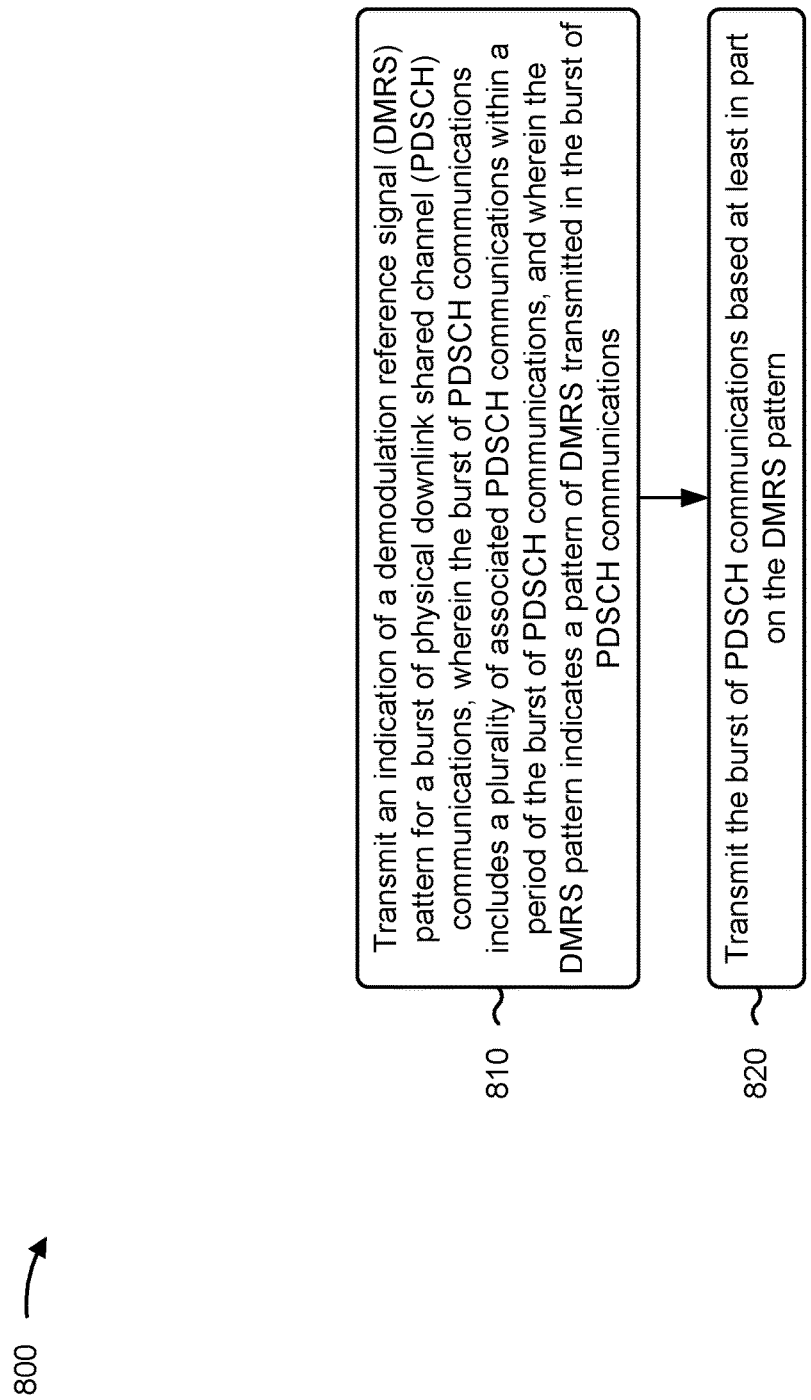
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with demodulation reference signaling for multi-channel semi-persistent scheduling.

As shown in FIG. 8, in some aspects, process 800 may include transmitting an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications (block 810). For example, the base station (e.g., using communication manager 150 and/or transmission component 1004, depicted in FIG. 10) may transmit an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications, as described above.

As further shown in FIG. 8, in some aspects, process 800 may include transmitting the burst of PDSCH communications based at least in part on the DMRS pattern (block 820). For example, the base station (e.g., using communication manager 150 and/or transmission component 1004, depicted in FIG. 10) may transmit the burst of PDSCH communications based at least in part on the DMRS pattern, as described above.

Process 800 may include additional aspects, such as any single aspect or any combination of aspects described below and/or in connection with one or more other processes described elsewhere herein.

In a first aspect, the indication of the DMRS pattern indicates that less than all of the one or more associated PDSCH communications of the burst of PDSCH communications include a corresponding DMRS.

In a second aspect, alone or in combination with the first aspect, the indication of the DMRS pattern indicates whether each of the one or more associated PDSCH communications of the burst of PDSCH communications includes a corresponding DMRS.

In a third aspect, alone or in combination with one or more of the first and second aspects, the indication of the DMRS pattern includes a bitmap indicating whether each of the one or more associated PDSCH communications of the burst of PDSCH communications includes the corresponding DMRS.

In a fourth aspect, alone or in combination with one or more of the first through third aspects, the indication of the DMRS pattern indicates that none of the one or more associated PDSCH communications of the burst of PDSCH communications includes a corresponding DMRS.

In a fifth aspect, alone or in combination with one or more of the first through fourth aspects, the indication of the DMRS pattern indicates that a first PDSCH communication, of the one or more associated PDSCH communications, includes the DMRS, wherein the DMRS pattern indicates that a second PDSCH communication, of the one or more associated PDSCH communications, does not include the DMRS, and wherein the first PDSCH communication occurs prior to the second PDSCH communication.

In a sixth aspect, alone or in combination with one or more of the first through fifth aspects, process 800 includes transmitting a data transmission in the first PDSCH communication.

In a seventh aspect, alone or in combination with one or more of the first through sixth aspects, process 800 includes transmitting a data transmission in the second PDSCH communication based at least in part on transmitting the DMRS in the first PDSCH communication.

In an eighth aspect, alone or in combination with one or more of the first through seventh aspects, process 800 includes transmitting the DMRS in the first PDSCH communication and transmitting no data transmissions in the first PDSCH communication.

In a ninth aspect, alone or in combination with one or more of the first through eighth aspects, the indication of the DMRS pattern indicates that the DMRS is transmitted separately from all PDSCH communications of the burst of PDSCH communications.

In a tenth aspect, alone or in combination with one or more of the first through ninth aspects, the indication of the DMRS pattern indicates that the DMRS is transmitted in a first slot that immediately precedes a second slot in which a first PDSCH communication, of the one or more associated PDSCH communications, begins.

In an eleventh aspect, alone or in combination with one or more of the first through tenth aspects, the DMRS is transmitted at a DMRS location within the first slot that corresponds to a configured DMRS location, in the second slot, of the first PDSCH communication.

In a twelfth aspect, alone or in combination with one or more of the first through eleventh aspects, the DMRS location and the configured DMRS location are associated with a same set of frequency resources and a same set of symbol indexes.

In a thirteenth aspect, alone or in combination with one or more of the first through twelfth aspects, the DMRS is transmitted in one or more last symbols of the first slot.

In a fourteenth aspect, alone or in combination with one or more of the first through thirteenth aspects, the DMRS is transmitted in a same number of DMRS symbols in the first slot as a number of configured DMRS symbols, in the second slot, of the first PDSCH communication.

In a fifteenth aspect, alone or in combination with one or more of the first through fourteenth aspects, a first PDSCH communication, of the one or more associated PDSCH communications, occurs within a first set of symbols within a slot, and wherein the indication of the DMRS pattern indicates that the DMRS is transmitted in a second set of symbols within the slot different than the first set of symbols.

In a sixteenth aspect, alone or in combination with one or more of the first through fifteenth aspects, a transmission power per resource element associated with the DMRS is greater than a transmission power per resource element associated with the burst of PDSCH communications.

In a seventeenth aspect, alone or in combination with one or more of the first through sixteenth aspects, each PDSCH communication, of the one or more associated PDSCH communications, includes a corresponding phase tracking reference signal (PTRS).

In an eighteenth aspect, alone or in combination with one or more of the first through seventeenth aspects, the indication of the DMRS pattern indicates an intra-burst periodicity parameter indicating whether each of the one or more associated PDSCH communications of the burst of PDSCH communications includes a corresponding DMRS.

In a nineteenth aspect, alone or in combination with one or more of the first through eighteenth aspects, the intra-burst periodicity parameter indicates a number of consecutive PDSCH communications, and wherein the DMRS is included in only one PDSCH communication out of the number of consecutive PDSCH communications.

In a twentieth aspect, alone or in combination with one or more of the first through nineteenth aspects, the indication of the DMRS pattern further indicates a pattern of DMRS transmitted across a plurality of bursts of PDSCH communications.

In a twenty-first aspect, alone or in combination with one or more of the first through twentieth aspects, the indication of the DMRS pattern indicates that less than all of the plurality of bursts of PDSCH communications are DMRS-bearing bursts of PDSCH communications, and wherein the indication of the DMRS pattern further indicates that less than all of the one or more associated PDSCH communications within each DMRS-bearing burst of PDSCH communications are DMRS-bearing PDSCH communications.

In a twenty-second aspect, alone or in combination with one or more of the first through twenty-first aspects, the indication of the DMRS pattern further indicates an inter-burst periodicity parameter indicating whether each of the plurality of bursts of PDSCH communications includes a corresponding DMRS.

In a twenty-third aspect, alone or in combination with one or more of the first through twenty-second aspects, the inter-burst periodicity parameter indicates a number of consecutive bursts of PDSCH communications, and wherein the DMRS is included in only one burst of PDSCH communications out of the number of consecutive bursts of PDSCH communications.

In a twenty-fourth aspect, alone or in combination with one or more of the first through twenty-third aspects, a first burst of PDSCH communications, of the plurality of bursts of PDSCH communications, is associated with a first transport block size (TBS) and includes the DMRS, and wherein a second burst of PDSCH communications, of the plurality of bursts of PDSCH communications, is associated with a second TBS and does not include the DMRS.

In a twenty-fifth aspect, alone or in combination with one or more of the first through twenty-fourth aspects, a number of resource elements, of the second burst of PDSCH communications and associated with the DMRS, are counted for determination of the second TBS.

In a twenty-sixth aspect, alone or in combination with one or more of the first through twenty-fifth aspects, a number of resource elements, of the second burst of PDSCH communications and associated with the DMRS, are not counted for determination of the second TBS.

In a twenty-seventh aspect, alone or in combination with one or more of the first through twenty-sixth aspects, process 800 includes transmitting a configuration indicating whether a number of resource elements, of the second burst of PDSCH communications and associated with the DMRS, are counted for determination of the second TBS.

In a twenty-eighth aspect, alone or in combination with one or more of the first through twenty-seventh aspects, the indication of the DMRS pattern is provided via at least one of a configuration of the burst of PDSCH communications, or activation downlink control information (DCI) for the burst of PDSCH communications.

In a twenty-ninth aspect, alone or in combination with one or more of the first through twenty-eighth aspects, the indication of the DMRS pattern indicates that none of the one or more associated PDSCH communications of the burst of PDSCH communications includes a corresponding DMRS, and wherein the DMRS is transmitted in a downlink transmission scheduled by a downlink control information (DCI) communication.

In a thirtieth aspect, alone or in combination with one or more of the first through twenty-ninth aspects, the DCI communication schedules a retransmission of a transmission of one of the one or more associated PDSCH communications of the burst of PDSCH communications, wherein the retransmission is associated with a same DMRS configuration as the burst of PDSCH communications.

In a thirty-first aspect, alone or in combination with one or more of the first through thirtieth aspects, the DCI communication schedules a PDSCH communication that is not included in the burst of PDSCH communications, and wherein a DMRS configuration of the PDSCH communication that is not included in the burst of PDSCH communications matches a DMRS configuration of the burst of PDSCH communications.

In a thirty-second aspect, alone or in combination with one or more of the first through thirty-first aspects, the DCI communication schedules a DMRS only transmission, and wherein a DMRS configuration of the DMRS only transmission matches a DMRS configuration of the burst of PDSCH communications.

In a thirty-third aspect, alone or in combination with one or more of the first through thirty-second aspects, the DCI communication further indicates a length of time in which to use the DMRS for channel estimation.

In a thirty-fourth aspect, alone or in combination with one or more of the first through thirty-third aspects, process 800 includes transmitting a configuration indicating whether additional DMRS should be included in the burst of PDSCH communications, and transmitting the burst of PDSCH communications based at least in part on the DMRS pattern and the configuration indicating whether the additional DMRS should be included in the burst of PDSCH communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
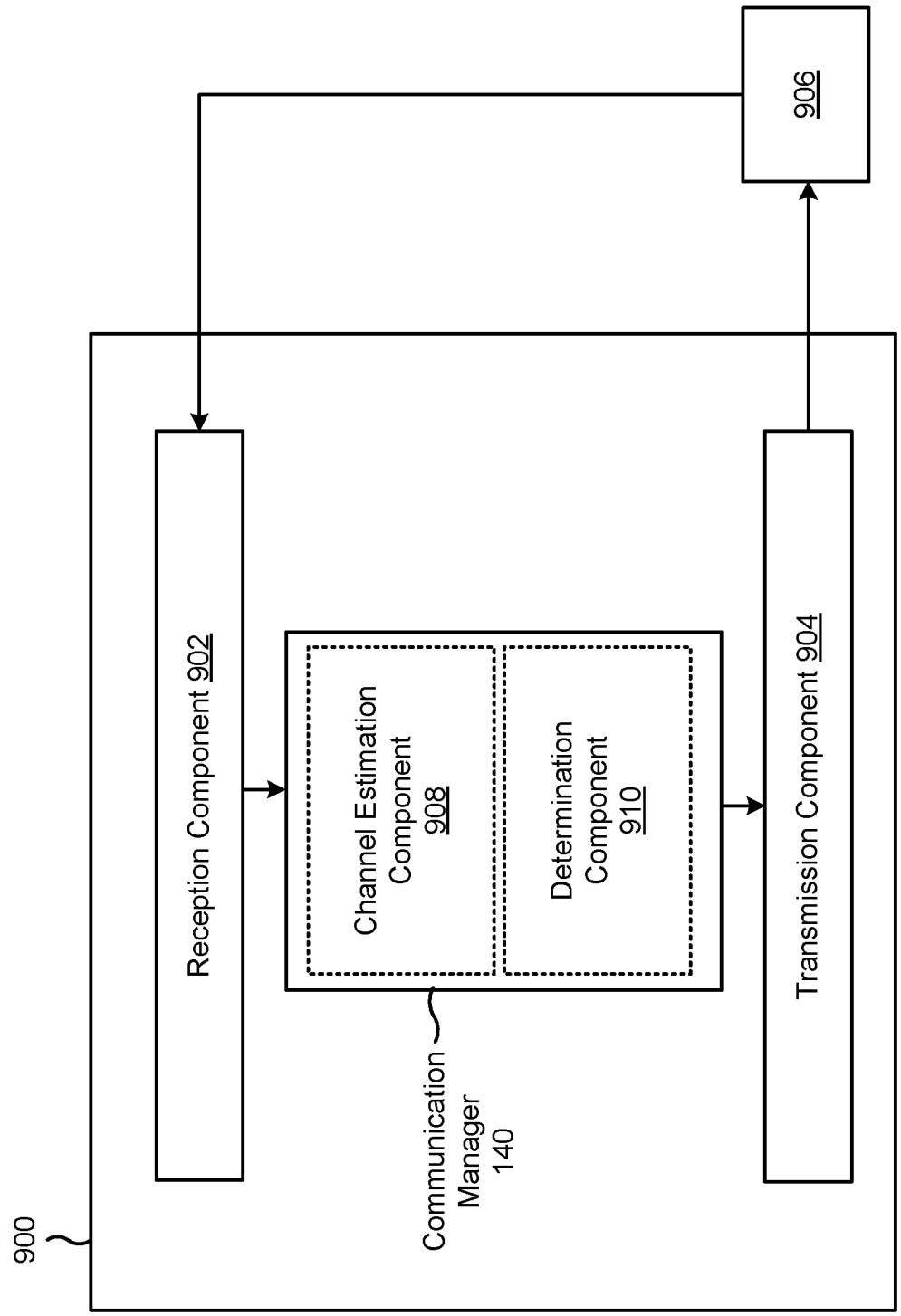
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a channel estimation component 908, or a determination component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The reception component 902 may receive the burst of PDSCH communications based at least in part on the DMRS pattern.

The channel estimation component 908 may estimate a channel for the burst of PDSCH communications using a DMRS from a prior PDSCH communication based at least in part on the indication that none of the one or more associated PDSCH communications of the burst of PDSCH communications includes the corresponding DMRS.

The determination component 910 may determine that no DMRS corresponding to the burst of PDSCH communications has been previously received.

The transmission component 904 may report a negative acknowledgement (NACK) message based at least in part on determining that no DMRS corresponding to the burst of PDSCH communications has been previously received.

The reception component 902 may receive a data transmission in the first PDSCH communication.

The reception component 902 may receive a data transmission in the second PDSCH communication based at least in part on receiving the DMRS in the first PDSCH communication.

The reception component 902 may receive the DMRS in the first PDSCH communication and receiving no data transmissions in the first PDSCH communication.

The reception component 902 may receive a configuration indicating whether a number of resource elements, of the second burst of PDSCH communications and associated with the DMRS, are counted for determination of the second TBS.

The reception component 902 may receive a configuration indicating whether additional DMRS should be included in the burst of PDSCH communications.

The reception component 902 may receive the burst of PDSCH communications based at least in part on the DMRS pattern and the configuration indicating whether the additional DMRS should be included in the burst of PDSCH communications.

The number and arrangement of components shown in FIG. 9 are provided as an example. In practice, there may be additional components, fewer components, different components, or differently arranged components than those shown in FIG. 9.

Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
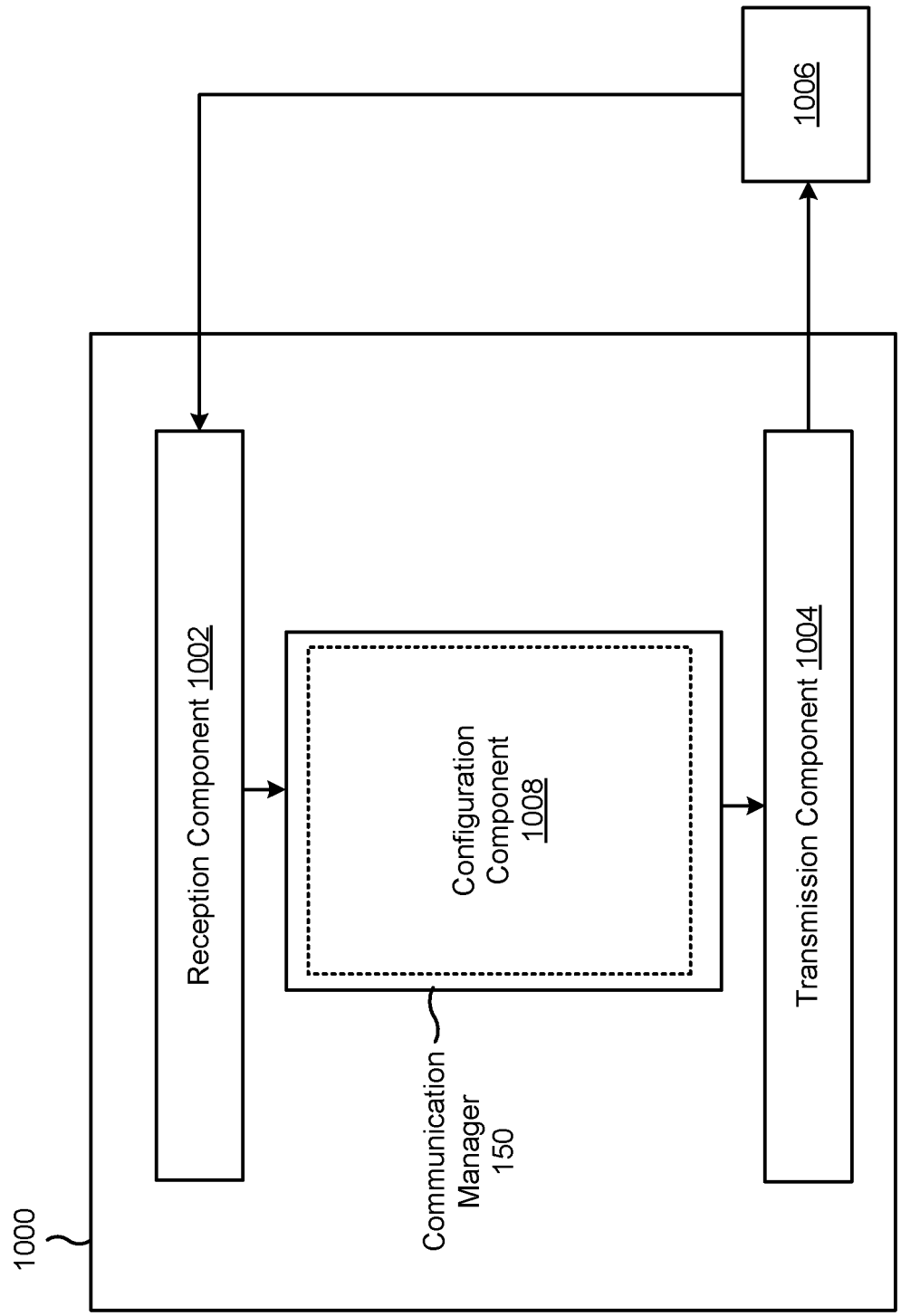
FIG. 10 is a diagram of an example apparatus for wireless communication, in accordance with the present disclosure.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit an indication of a DMRS pattern for a burst of PDSCH communications, wherein the burst of PDSCH communications includes one or more associated PDSCH communications within a period of the burst of PDSCH communications, and wherein the DMRS pattern indicates a pattern of DMRS transmitted in the burst of PDSCH communications. The transmission component 1004 may transmit the burst of PDSCH communications based at least in part on the DMRS pattern.

The transmission component 1004 may transmit a data transmission in the first PDSCH communication.

The transmission component 1004 may transmit a data transmission in the second PDSCH communication based at least in part on transmitting the DMRS in the first PDSCH communication.

The transmission component 1004 may transmit the DMRS in the first PDSCH communication and transmit no data transmissions in the first PDSCH communication.

The transmission component 1004 and/or the configuration component 1008 may transmit a configuration indicating whether a number of resource elements, of the second burst of PDSCH communications and associated with the DMRS, are counted for determination of the second TBS.

The transmission component 1004 and/or the configuration component 1008 may transmit a configuration indicating whether additional DMRS should be included in the burst of PDSCH communications.

The transmission component 1004 may transmit the burst of PDSCH communications based at least in part on the DMRS pattern and the configuration indicating whether the additional DMRS should be included in the burst of PDSCH communications.

The number and arrangement of components shown in FIG. 10 are provided as an example. In practice, there may be additional components, fewer components, different components, or differently arranged components than those shown in FIG. 10.

Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving an indication of a demodulation reference signal (DMRS) pattern for a burst of physical downlink shared channel (PDSCH) communications, wherein the burst of PDSCH communications includes one or more associated PDSCH communications within a period of the burst of PDSCH communications, and wherein the DMRS pattern indicates a pattern of DMRS transmitted in the burst of PDSCH communications; and receiving the burst of PDSCH communications based at least in part on the DMRS pattern.

Aspect 2: The method of Aspect 1, wherein the indication of the DMRS pattern indicates that less than all of the one or more associated PDSCH communications of the burst of PDSCH communications include a corresponding DMRS.

Aspect 3: The method of any of Aspects 1-2, wherein the indication of the DMRS pattern indicates whether each of the one or more associated PDSCH communications of the burst of PDSCH communications includes a corresponding DMRS.

Aspect 4: The method of Aspect 3, wherein the indication of the DMRS pattern includes a bitmap indicating whether each of the one or more associated PDSCH communications of the burst of PDSCH communications includes the corresponding DMRS.

Aspect 5: The method of any of Aspects 1-3, wherein the indication of the DMRS pattern indicates that none of the one or more associated PDSCH communications of the burst of PDSCH communications includes a corresponding DMRS.

Aspect 6: The method of Aspect 5, further comprising estimating a channel for the burst of PDSCH communications using a DMRS from a prior PDSCH communication based at least in part on the indication that none of the one or more associated PDSCH communications of the burst of PDSCH communications includes the corresponding DMRS.

Aspect 7: The method of Aspect 5, further comprising: determining that no DMRS corresponding to the burst of PDSCH communications has been previously received; and reporting a negative acknowledgement (NACK) message based at least in part on determining that no DMRS corresponding to the burst of PDSCH communications has been previously received.

Aspect 8: The method of any of Aspects 1-4, wherein the indication of the DMRS pattern indicates that a first PDSCH communication, of the one or more associated PDSCH communications, includes the DMRS, wherein the DMRS pattern indicates that a second PDSCH communication, of the one or more associated PDSCH communications, does not include the DMRS, and wherein the first PDSCH communication occurs prior to the second PDSCH communication.

Aspect 9: The method of Aspect 8, further comprising receiving a data transmission in the first PDSCH communication.

Aspect 10: The method of Aspect 8, further comprising receiving a data transmission in the second PDSCH communication based at least in part on receiving the DMRS in the first PDSCH communication.

Aspect 11: The method of Aspect 8, further comprising receiving the DMRS in the first PDSCH communication and receiving no data transmissions in the first PDSCH communication.

Aspect 12: The method of any of Aspects 1-11, wherein the indication of the DMRS pattern indicates that the DMRS is transmitted separately from all PDSCH communications of the burst of PDSCH communications.

Aspect 13: The method of Aspect 12, wherein the indication of the DMRS pattern indicates that the DMRS is transmitted in a first slot that immediately precedes a second slot in which a first PDSCH communication, of the one or more associated PDSCH communications, begins.

Aspect 14: The method of Aspect 13, wherein the DMRS is transmitted at a DMRS location within the first slot that corresponds to a configured DMRS location, in the second slot, of the first PDSCH communication.

Aspect 15: The method of Aspect 14, wherein the DMRS location and the configured DMRS location are associated with a same set of frequency resources and a same set of symbol indexes.

Aspect 16: The method of Aspect 13, wherein the DMRS is transmitted in one or more last symbols of the first slot.

Aspect 17: The method of Aspect 13, wherein the DMRS is transmitted in a same number of DMRS symbols in the first slot as a number of configured DMRS symbols, in the second slot, of the first PDSCH communication.

Aspect 18: The method of Aspect 12, wherein a first PDSCH communication, of the one or more associated PDSCH communications, occurs within a first set of symbols within a slot, and wherein the indication of the DMRS pattern indicates that the DMRS is transmitted in a second set of symbols within the slot different than the first set of symbols.

Aspect 19: The method of Aspect 12, wherein a transmission power per resource element associated with the DMRS is greater than a transmission power per resource element associated with the burst of PDSCH communications.

Aspect 20: The method of any of Aspects 1, wherein each PDSCH communication, of the one or more associated PDSCH communications, includes a corresponding phase tracking reference signal (PTRS).

Aspect 21: The method of any of Aspects 1-21, wherein the indication of the DMRS pattern indicates an intra-burst periodicity parameter indicating whether each of the one or more associated PDSCH communications of the burst of PDSCH communications includes a corresponding DMRS.

Aspect 22: The method of Aspect 21, wherein the intra-burst periodicity parameter indicates a number of consecutive PDSCH communications, and wherein the DMRS is included in only one PDSCH communication out of the number of consecutive PDSCH communications.

Aspect 23: The method of Aspect 1, wherein the indication of the DMRS pattern further indicates a pattern of DMRS transmitted across a plurality of bursts of PDSCH communications.

Aspect 24: The method of Aspect 23, wherein the indication of the DMRS pattern indicates that less than all of the plurality of bursts of PDSCH communications are DMRS-bearing bursts of PDSCH communications, and wherein the indication of the DMRS pattern further indicates that less than all of the one or more associated PDSCH communications within each DMRS-bearing burst of PDSCH communications are DMRS-bearing PDSCH communications.

Aspect 25: The method of Aspect 23, wherein the indication of the DMRS pattern further indicates an inter-burst periodicity parameter indicating whether each of the plurality of bursts of PDSCH communications includes a corresponding DMRS.

Aspect 26: The method of Aspect 25, wherein the inter-burst periodicity parameter indicates a number of consecutive bursts of PDSCH communications, and wherein the DMRS is included in only one burst of PDSCH communications out of the number of consecutive bursts of PDSCH communications.

Aspect 27: The method of Aspect 23, wherein a first burst of PDSCH communications, of the plurality of bursts of PDSCH communications, is associated with a first transport block size (TBS) and includes the DMRS, and wherein a second burst of PDSCH communications, of the plurality of bursts of PDSCH communications, is associated with a second TBS and does not include the DMRS.

Aspect 28: The method of Aspect 27, wherein a number of resource elements, of the second burst of PDSCH communications and associated with the DMRS, are counted for determination of the second TBS.

Aspect 29: The method of Aspect 27, wherein a number of resource elements, of the second burst of PDSCH communications and associated with the DMRS, are not counted for determination of the second TBS.

Aspect 30: The method of Aspect 27, further comprising receiving a configuration indicating whether a number of resource elements, of the second burst of PDSCH communications and associated with the DMRS, are counted for determination of the second TBS.

Aspect 31: The method of any of Aspects 1-30, wherein the indication of the DMRS pattern is provided via at least one of: a configuration of the burst of PDSCH communications, or activation downlink control information (DCI) for the burst of PDSCH communications.

Aspect 32: The method of any of Aspects 1-7, 12-21, 23-25, and 31, wherein the indication of the DMRS pattern indicates that none of the one or more associated PDSCH communications of the burst of PDSCH communications includes a corresponding DMRS, and wherein the DMRS is transmitted in a downlink transmission scheduled by a downlink control information (DCI) communication.

Aspect 33: The method of Aspect 32, wherein the DCI communication schedules a retransmission of a transmission of one of the one or more associated PDSCH communications of the burst of PDSCH communications, wherein the retransmission is associated with a same DMRS configuration as the burst of PDSCH communications.

Aspect 34: The method of Aspect 32, wherein the DCI communication schedules a PDSCH communication that is not included in the burst of PDSCH communications, and wherein a DMRS configuration of the PDSCH communication that is not included in the burst of PDSCH communications matches a DMRS configuration of the burst of PDSCH communications.

Aspect 35: The method of Aspect 32, wherein the DCI communication schedules a DMRS only transmission, and wherein a DMRS configuration of the DMRS only transmission matches a DMRS configuration of the burst of PDSCH communications.

Aspect 36: The method of Aspect 32, wherein the DCI communication further indicates a length of time in which to use the DMRS for channel estimation.

Aspect 37: The method of any of Aspects 1-36, further comprising: receiving a configuration indicating whether additional DMRS should be included in the burst of PDSCH communications; and receiving the burst of PDSCH communications based at least in part on the DMRS pattern and the configuration indicating whether the additional DMRS should be included in the burst of PDSCH communications.

Aspect 38: A method of wireless communication performed by a base station, comprising: transmitting an indication of a demodulation reference signal (DMRS) pattern for a burst of physical downlink shared channel (PDSCH) communications, wherein the burst of PDSCH communications includes one or more associated PDSCH communications within a period of the burst of PDSCH communications, and wherein the DMRS pattern indicates a pattern of DMRS transmitted in the burst of PDSCH communications; and transmitting the burst of PDSCH communications based at least in part on the DMRS pattern.

Aspect 39: The method of Aspect 38, wherein the indication of the DMRS pattern indicates that less than all of the one or more associated PDSCH communications of the burst of PDSCH communications include a corresponding DMRS.

Aspect 40: The method of any of Aspects 38-39, wherein the indication of the DMRS pattern indicates whether each of the one or more associated PDSCH communications of the burst of PDSCH communications includes a corresponding DMRS.

Aspect 41: The method of Aspect 40, wherein the indication of the DMRS pattern includes a bitmap indicating whether each of the one or more associated PDSCH communications of the burst of PDSCH communications includes the corresponding DMRS.

Aspect 42: The method of any of Aspects 38-41, wherein the indication of the DMRS pattern indicates that none of the one or more associated PDSCH communications of the burst of PDSCH communications includes a corresponding DMRS.

Aspect 43: The method of any of Aspects 38-41, wherein the indication of the DMRS pattern indicates that a first PDSCH communication, of the one or more associated PDSCH communications, includes the DMRS, wherein the DMRS pattern indicates that a second PDSCH communication, of the one or more associated PDSCH communications, does not include the DMRS, and wherein the first PDSCH communication occurs prior to the second PDSCH communication.

Aspect 44: The method of Aspect 43, further comprising transmitting a data transmission in the first PDSCH communication.

Aspect 45: The method of Aspect 43, further comprising transmitting a data transmission in the second PDSCH communication based at least in part on transmitting the DMRS in the first PDSCH communication.

Aspect 46: The method of Aspect 43, further comprising transmitting the DMRS in the first PDSCH communication and transmitting no data transmissions in the first PDSCH communication.

Aspect 47: The method of any of Aspects 38-46, wherein the indication of the DMRS pattern indicates that the DMRS is transmitted separately from all PDSCH communications of the burst of PDSCH communications.

Aspect 48: The method of Aspect 47, wherein the indication of the DMRS pattern indicates that the DMRS is transmitted in a first slot that immediately precedes a second slot in which a first PDSCH communication, of the one or more associated PDSCH communications, begins.

Aspect 49: The method of Aspect 48, wherein the DMRS is transmitted at a DMRS location within the first slot that corresponds to a configured DMRS location, in the second slot, of the first PDSCH communication.

Aspect 50: The method of Aspect 49, wherein the DMRS location and the configured DMRS location are associated with a same set of frequency resources and a same set of symbol indexes.

Aspect 51: The method of Aspect 48, wherein the DMRS is transmitted in one or more last symbols of the first slot.

Aspect 52: The method of Aspect 48, wherein the DMRS is transmitted in a same number of DMRS symbols in the first slot as a number of configured DMRS symbols, in the second slot, of the first PDSCH communication.

Aspect 53: The method of Aspect 47, wherein a first PDSCH communication, of the one or more associated PDSCH communications, occurs within a first set of symbols within a slot, and wherein the indication of the DMRS pattern indicates that the DMRS is transmitted in a second set of symbols within the slot different than the first set of symbols.

Aspect 54: The method of Aspect 47, wherein a transmission power per resource element associated with the DMRS is greater than a transmission power per resource element associated with the burst of PDSCH communications.

Aspect 55: The method of any of Aspects 38-54, wherein each PDSCH communication, of the one or more associated PDSCH communications, includes a corresponding phase tracking reference signal (PTRS).

Aspect 56: The method of any of Aspects 38-55, wherein the indication of the DMRS pattern indicates an intra-burst periodicity parameter indicating whether each of the one or more associated PDSCH communications of the burst of PDSCH communications includes a corresponding DMRS.

Aspect 57: The method of Aspect 56, wherein the intra-burst periodicity parameter indicates a number of consecutive PDSCH communications, and wherein the DMRS is included in only one PDSCH communication out of the number of consecutive PDSCH communications.

Aspect 58: The method of any of Aspects 38-57, wherein the indication of the DMRS pattern further indicates a pattern of DMRS transmitted across a plurality of bursts of PDSCH communications.

Aspect 59: The method of Aspect 58, wherein the indication of the DMRS pattern indicates that less than all of the plurality of bursts of PDSCH communications are DMRS-bearing bursts of PDSCH communications, and wherein the indication of the DMRS pattern further indicates that less than all of the one or more associated PDSCH communications within each DMRS-bearing burst of PDSCH communications are DMRS-bearing PDSCH communications.

Aspect 60: The method of Aspect 58, wherein the indication of the DMRS pattern further indicates an inter-burst periodicity parameter indicating whether each of the plurality of bursts of PDSCH communications includes a corresponding DMRS.

Aspect 61: The method of Aspect 60, wherein the inter-burst periodicity parameter indicates a number of consecutive bursts of PDSCH communications, and wherein the DMRS is included in only one burst of PDSCH communications out of the number of consecutive bursts of PDSCH communications.

Aspect 62: The method of Aspect 58, wherein a first burst of PDSCH communications, of the plurality of bursts of PDSCH communications, is associated with a first transport block size (TBS) and includes the DMRS, and wherein a second burst of PDSCH communications, of the plurality of bursts of PDSCH communications, is associated with a second TBS and does not include the DMRS.

Aspect 63: The method of Aspect 62, wherein a number of resource elements, of the second burst of PDSCH communications and associated with the DMRS, are counted for determination of the second TBS.

Aspect 64: The method of Aspect 62, wherein a number of resource elements, of the second burst of PDSCH communications and associated with the DMRS, are not counted for determination of the second TBS.

Aspect 65: The method of Aspect 62, further comprising transmitting a configuration indicating whether a number of resource elements, of the second burst of PDSCH communications and associated with the DMRS, are counted for determination of the second TBS.

Aspect 66: The method of any of Aspects 38-65, wherein the indication of the DMRS pattern is provided via at least one of: a configuration of the burst of PDSCH communications, or activation downlink control information (DCI) for the burst of PDSCH communications.

Aspect 67: The method of any of Aspects 38-42, 47-56, 58-60, and 66, wherein the indication of the DMRS pattern indicates that none of the one or more associated PDSCH communications of the burst of PDSCH communications includes a corresponding DMRS, and wherein the DMRS is transmitted in a downlink transmission scheduled by a downlink control information (DCI) communication.

Aspect 68: The method of Aspect 67, wherein the DCI communication schedules a retransmission of a transmission of one of the one or more associated PDSCH communications of the burst of PDSCH communications, wherein the retransmission is associated with a same DMRS configuration as the burst of PDSCH communications.

Aspect 69: The method of Aspect 67, wherein the DCI communication schedules a PDSCH communication that is not included in the burst of PDSCH communications, and wherein a DMRS configuration of the PDSCH communication that is not included in the burst of PDSCH communications matches a DMRS configuration of the burst of PDSCH communications.

Aspect 70: The method of Aspect 67, wherein the DCI communication schedules a DMRS only transmission, and wherein a DMRS configuration of the DMRS only transmission matches a DMRS configuration of the burst of PDSCH communications.

Aspect 71: The method of Aspect 67, wherein the DCI communication further indicates a length of time in which to use the DMRS for channel estimation.

Aspect 72: The method of any of Aspects 1-38, further comprising: transmitting a configuration indicating whether additional DMRS should be included in the burst of PDSCH communications; and transmitting the burst of PDSCH communications based at least in part on the DMRS pattern and the configuration indicating whether the additional DMRS should be included in the burst of PDSCH communications.

Aspect 73: An apparatus for wireless communication at a device, comprising a processor; memory coupled with the processor; and instructions stored in the memory and executable by the processor to cause the apparatus to perform the method of one or more of Aspects 1-37.

Aspect 74: A device for wireless communication, comprising a memory and one or more processors coupled to the memory, the one or more processors configured to perform the method of one or more of Aspects 1-37.

Aspect 75: An apparatus for wireless communication, comprising at least one means for performing the method of one or more of Aspects 1-37.

Aspect 76: A non-transitory computer-readable medium storing code for wireless communication, the code comprising instructions executable by a processor to perform the method of one or more of Aspects 1-37.

Aspect 77: A non-transitory computer-readable medium storing a set of instructions for wireless communication, the set of instructions comprising one or more instructions that, when executed by one or more processors of a device, cause the device to perform the method of one or more of Aspects 1-37.

Aspect 78: An apparatus for wireless communication at a device, comprising a processor; memory coupled with the processor; and instructions stored in the memory and executable by the processor to cause the apparatus to perform the method of one or more of Aspects 38-72.

Aspect 79: A device for wireless communication, comprising a memory and one or more processors coupled to the memory, the one or more processors configured to perform the method of one or more of Aspects 38-72.

Aspect 80: An apparatus for wireless communication, comprising at least one means for performing the method of one or more of Aspects 38-72.

Aspect 81: A non-transitory computer-readable medium storing code for wireless communication, the code comprising instructions executable by a processor to perform the method of one or more of Aspects 38-72.

Aspect 82: A non-transitory computer-readable medium storing a set of instructions for wireless communication, the set of instructions comprising one or more instructions that, when executed by one or more processors of a device, cause the device to perform the method of one or more of Aspects 38-72.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive an indication of a demodulation reference signal (DMRS) pattern for a burst of physical downlink shared channel (PDSCH) communications,
wherein the burst of PDSCH communications includes multiple associated PDSCH communications within a period of the burst of PDSCH communications, the burst of PDSCH communications being semi-persistently scheduled to reoccur every period, and
wherein the DMRS pattern indicates a pattern of DMRS transmitted in the burst of PDSCH communications; and
receive the burst of PDSCH communications based at least in part on the DMRS pattern.

2. The apparatus of claim 1, wherein the indication of the DMRS pattern indicates that less than all of the multiple associated PDSCH communications of the burst of PDSCH communications include a corresponding DMRS.

3. The apparatus of claim 1, wherein the indication of the DMRS pattern indicates that none of the multiple associated PDSCH communications of the burst of PDSCH communications includes a corresponding DMRS.

4. The apparatus of claim 3, wherein the one or more processors are further configured to estimate a channel for the burst of PDSCH communications using a DMRS from a prior PDSCH communication based at least in part on the indication that none of the multiple associated PDSCH communications of the burst of PDSCH communications includes the corresponding DMRS.

5. The apparatus of claim 1, wherein the indication of the DMRS pattern indicates that a first PDSCH communication, of the multiple associated PDSCH communications, includes the DMRS, wherein the DMRS pattern indicates that a second PDSCH communication, of the multiple associated PDSCH communications, does not include the DMRS, and wherein the first PDSCH communication occurs prior to the second PDSCH communication.

6. The apparatus of claim 5, wherein the one or more processors are further configured to receive a data transmission in the first PDSCH communication.

7. The apparatus of claim 5, wherein the one or more processors are further configured to receive a data transmission in the second PDSCH communication based at least in part on receiving the DMRS in the first PDSCH communication.

8. The apparatus of claim 1, wherein the indication of the DMRS pattern indicates that the DMRS is transmitted separately from all PDSCH communications of the burst of PDSCH communications.

9. The apparatus of claim 8, wherein the indication of the DMRS pattern indicates that the DMRS is transmitted in a first slot that immediately precedes a second slot in which a first PDSCH communication, of the multiple associated PDSCH communications, begins.

10. The apparatus of claim 9, wherein the DMRS is transmitted at a DMRS location within the first slot that corresponds to a configured DMRS location, in the second slot, of the first PDSCH communication.

11. The apparatus of claim 1, wherein the indication of the DMRS pattern indicates an intra-burst periodicity parameter indicating whether each of the multiple associated PDSCH communications of the burst of PDSCH communications includes a corresponding DMRS.

12. The apparatus of claim 1, wherein the indication of the DMRS pattern further indicates the pattern of DMRS transmitted across a plurality of bursts of PDSCH communications.

13. The apparatus of claim 12, wherein the indication of the DMRS pattern indicates that less than all of the plurality of bursts of PDSCH communications are DMRS-bearing bursts of PDSCH communications, and wherein the indication of the DMRS pattern further indicates that less than all of the multiple associated PDSCH communications within each DMRS-bearing burst of PDSCH communications are DMRS-bearing PDSCH communications.

14. The apparatus of claim 12, wherein the indication of the DMRS pattern further indicates an inter-burst periodicity parameter indicating whether each of the plurality of bursts of PDSCH communications includes a corresponding DMRS.

15. The apparatus of claim 12, wherein a first burst of PDSCH communications, of the plurality of bursts of PDSCH communications, is associated with a first transport block size (TBS) and includes the DMRS, and wherein a second burst of PDSCH communications, of the plurality of bursts of PDSCH communications, is associated with a second TBS and does not include the DMRS.

16. The apparatus of claim 15, wherein a number of resource elements, of the second burst of PDSCH communications and associated with the DMRS, are counted for determination of the second TBS.

17. The apparatus of claim 15, wherein a number of resource elements, of the second burst of PDSCH communications and associated with the DMRS, are not counted for determination of the second TBS.

18. The apparatus of claim 1, wherein the indication of the DMRS pattern is provided via at least one of:
a configuration of the burst of PDSCH communications, or
activation downlink control information (DCI) for the burst of PDSCH communications.

19. The apparatus of claim 1, wherein the indication of the DMRS pattern indicates that none of the multiple associated PDSCH communications of the burst of PDSCH communications includes a corresponding DMRS, and wherein the DMRS is transmitted in a downlink transmission scheduled by a downlink control information (DCI) communication.

20. The apparatus of claim 1, wherein the one or more processors are further configured to:

receive a configuration indicating whether additional DMRS should be included in the burst of PDSCH communications; and receive the burst of PDSCH communications based at least in part on the DMRS pattern and the configuration indicating whether the additional DMRS should be included in the burst of PDSCH communications.

21. An apparatus for wireless communication at a network entity, comprising:
one or more memories; and
one or more processors, coupled to the one or more memories, configured to:
transmit an indication of a demodulation reference signal (DMRS) pattern for a burst of physical downlink shared channel (PDSCH) communications,
wherein the burst of PDSCH communications includes multiple associated PDSCH communications within a period of the burst of PDSCH communications, the burst of PDSCH communications being semi-persistently scheduled to reoccur every period, and
wherein the DMRS pattern indicates a pattern of DMRS transmitted in the burst of PDSCH communications; and
transmit the burst of PDSCH communications based at least in part on the DMRS pattern.

22. The apparatus of claim 21, wherein the indication of the DMRS pattern indicates that less than all of the multiple associated PDSCH communications of the burst of PDSCH communications include a corresponding DMRS.

23. The apparatus of claim 21, wherein the indication of the DMRS pattern indicates that the DMRS is transmitted separately from all PDSCH communications of the burst of PDSCH communications.

24. The apparatus of claim 21, wherein the indication of the DMRS pattern further indicates the pattern of DMRS transmitted across a plurality of bursts of PDSCH communications.

25. The apparatus of claim 24, wherein the indication of the DMRS pattern indicates that less than all of the plurality of bursts of PDSCH communications are DMRS-bearing bursts of PDSCH communications, and wherein the indication of the DMRS pattern further indicates that less than all of the multiple associated PDSCH communications within each DMRS-bearing burst of PDSCH communications are DMRS-bearing PDSCH communications.

26. A method of wireless communication performed by a user equipment (UE), comprising:
receiving an indication of a demodulation reference signal (DMRS) pattern for a burst of physical downlink shared channel (PDSCH) communications,
wherein the burst of PDSCH communications includes multiple associated PDSCH communications within a period of the burst of PDSCH communications, the burst of PDSCH communications being semi-persistently scheduled to reoccur every period, and
wherein the DMRS pattern indicates a pattern of DMRS transmitted in the burst of PDSCH communications; and
receiving the burst of PDSCH communications based at least in part on the DMRS pattern.

27. The method of claim 26, wherein the indication of the DMRS pattern indicates that less than all of the multiple associated PDSCH communications of the burst of PDSCH communications include a corresponding DMRS.

28. The method of claim 26, wherein the indication of the DMRS pattern indicates that the DMRS is transmitted separately from all PDSCH communications of the burst of PDSCH communications.

29. A method of wireless communication performed by a network entity, comprising:
transmitting an indication of a demodulation reference signal (DMRS) pattern for a burst of physical downlink shared channel (PDSCH) communications,
wherein the burst of PDSCH communications includes multiple associated PDSCH communications within a period of the burst of PDSCH communications, the burst of PDSCH communications being semi-persistently scheduled to reoccur every period, and
wherein the DMRS pattern indicates a pattern of DMRS transmitted in the burst of PDSCH communications; and
transmitting the burst of PDSCH communications based at least in part on the DMRS pattern.

30. The method of claim 29, wherein the indication of the DMRS pattern indicates that less than all of the multiple associated PDSCH communications of the burst of PDSCH communications include a corresponding DMRS.

\* \* \* \* \*